United States Patent [19]
Yamazaki et al.

[11] Patent Number: 5,761,559
[45] Date of Patent: Jun. 2, 1998

[54] CAMERA EQUIPPED WITH LIGHT BLOCKING DOOR OPENING AND CLOSING MECHANISM

[75] Inventors: Youichi Yamazaki, Kawasaki; Toshiyuki Nakamura, Tokyo; Keishi Urata, Kumamoto, all of Japan

[73] Assignee: Nikon Corporation, Tokyo, Japan

[21] Appl. No.: 707,254

[22] Filed: Sep. 3, 1996

[30] Foreign Application Priority Data

Aug. 31, 1995 [JP] Japan .................................. 7-223726
Jan. 29, 1996 [JP] Japan .................................. 8-012912

[51] Int. Cl.$^6$ .................................................. G03B 17/24
[52] U.S. Cl. ............................ 396/513; 396/538; 396/543
[58] Field of Search ................................ 396/543, 538, 396/513

[56] References Cited

U.S. PATENT DOCUMENTS 5,612,760  3/1997  Okuno ................................ 396/513

*Primary Examiner*—David M. Gray
*Attorney, Agent, or Firm*—Oliff & Berridge, PLC

[57] ABSTRACT

An opening and closing apparatus for opening and closing a light blocking door provided at a film feed slot of a film cartridge comprises a drive device that drives the light blocking door to open and close, a single switch that outputs a signal with a specific pattern with a light blocking door opening and closing operation of the drive device and a control device that controls the drive device based upon the output signal from the switch. The switch, for instance, includes a switch pattern that is integrated with a rotating member constituting the drive device and a brush that slides on the switch pattern as the rotating member rotates.

20 Claims, 26 Drawing Sheets

WHEN OPENING / CLOSING
THE LIGHT BLOCKING DOOR

DISENGAGED POSITION

ENGAGED POSITION

CAMERA EQUIPPED WITH LIGHT BLOCKING DOOR OPENING AND CLOSING MECHANISM

BACKGROUND OF THE INVENTION

1. Field of the Invention

The present invention relates to a light blocking door opening and closing apparatus for opening and closing a film feed slot in a film cartridge.

2. Description of the Related Art

In a photographic film cartridge of the prior art, a light blocking member is provided at the film feed slot so that light from the outside is prevented from entering the cartridge. As an alternative to the light blocking member, a cartridge provided with a light blocking door that can open and close at the film feed slot has been disclosed. When employing such a cartridge, it is conceivable to adopt a method in which the user manually opens the light blocking door after the cartridge is inserted in the camera, for instance. However, this method would complicate operation of the camera. Addressing this problem, a number of methods for automatically opening the light blocking door with a motor or the like, by interlocking with the closing of the cartridge chamber lid of the camera after the cartridge has been loaded in the camera, have been proposed.

SUMMARY OF THE INVENTION

An object of the present invention is to provide a light blocking door opening and closing apparatus with which it is possible to detect the open/closed state of the cartridge light blocking door with a simple structure.

In order to achieve the object described above, the opening and closing apparatus for opening and closing the light blocking door provided at the film feed slot of the film cartridge according to the present invention comprises a drive device that drives the light blocking door to open/close it, a single switch that outputs a signal with a specific pattern by interlocking with the light blocking door opening/closing operation performed by the drive device and a control device that controls the drive device in correspondence to the output signal from the switch.

An open/closed detection mechanism of the light blocking door may conceivably be constituted with, for instance, a switch that detects that the light blocking door has been driven to the open position, and a switch that detects that the light blocking door has been driven to the closed position so that, based upon the on/off states of the switches, drive/stop of the light blocking door can be controlled. However, this method requires two switches and they must be provided at different locations, which, in turn, results in the camera becoming larger and costlier to produce. According to the present invention, a single switch that outputs a signal with a specific pattern by interlocking with the light blocking door opening/closing operation performed by the drive device is employed and the light blocking door is controlled based upon the output signal from this switch. Consequently, only one switch is required, achieving miniaturization of the camera and a reduction in production costs.

DETAILED DESCRIPTION OF THE PREFERRED EMBODIMENTS

First Embodiment

The first embodiment according to the present invention is explained in reference to FIGS. 1~21.

Figure 1:
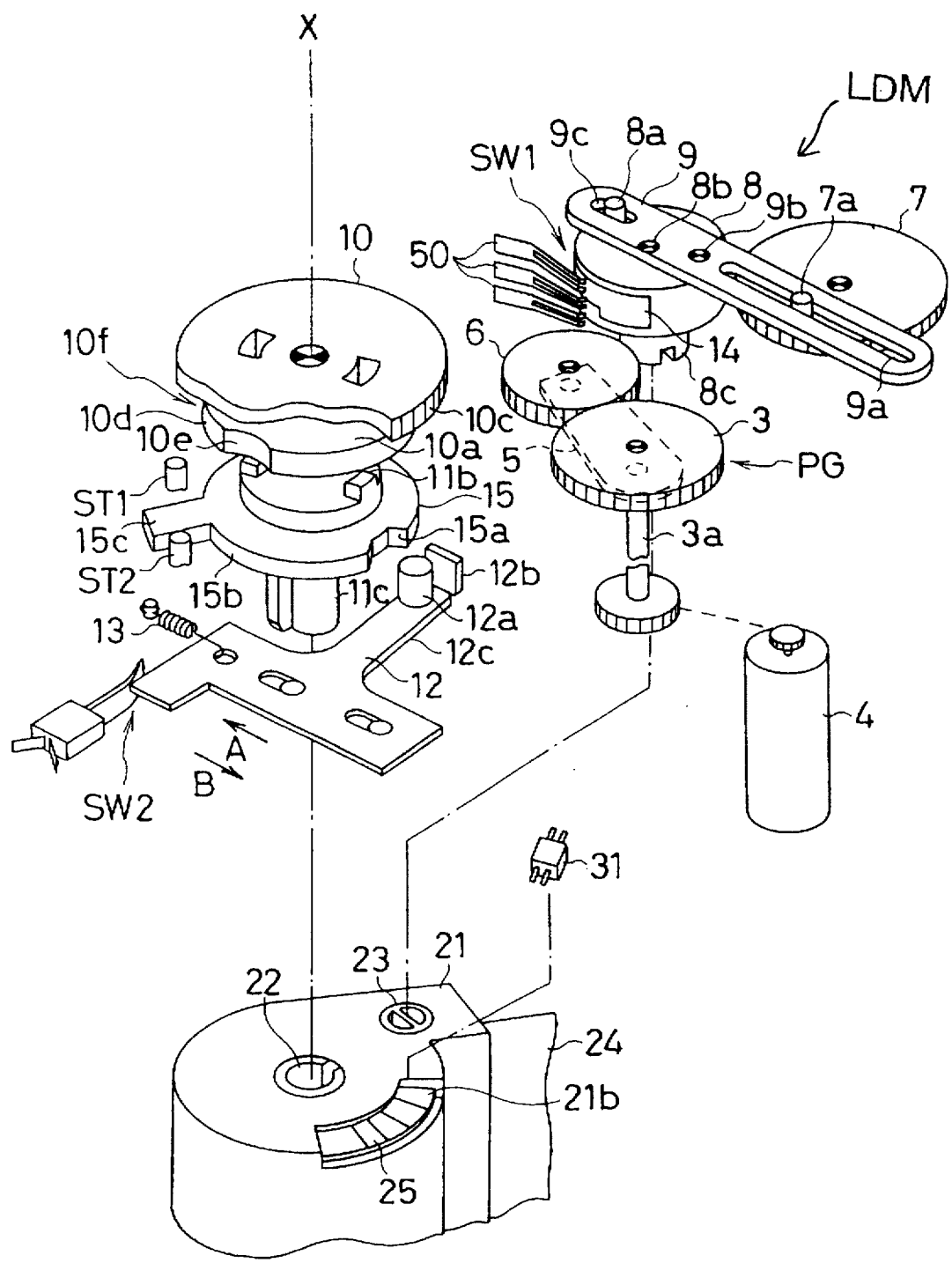
FIG. 1 is a perspective of the peripheral devices of the light blocking door opening and closing apparatus in a first embodiment according to the present invention, shown along with a cartridge.
Figure 2:
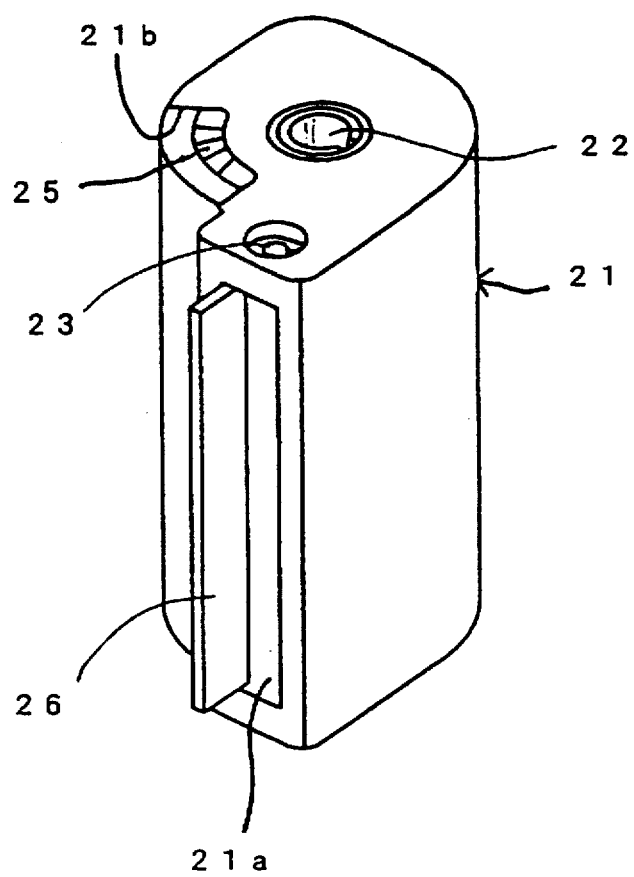
FIG. 2 is a perspective showing the entirety of the cartridge in FIG. 1.

FIG. 1 is a perspective showing the structure of the light blocking door opening and closing apparatus in a camera in the first embodiment. In a film cartridge 21 that is to be loaded in the camera body, a spool shaft around which film 24 is wound, is housed in such a manner that it can rotate, with the upper connecting portion of the spool shaft 22 exposed at the upper surface of the cartridge. As shown in FIG. 2, a light blocking door 26, which opens and closes a film feed slot 21a, is provided in the cartridge and, with the rotation of a light blocking door shaft 23 exposed at the upper surface of the cartridge, the light blocking door 26 is opened and closed. The film 24 can be fed from the cartridge 21 only when the light blocking door 26 is open.

In FIG. 1, reference number 25 indicates a bar code disk that can rotate together with the spool shaft 22, and a bar code pattern drawn on its upper surface is exposed through a window 21b formed at the upper surface of the cartridge. This bar code pattern indicates film information such as the film sensitivity and the number of photographic frames, and when the bar code disk 25 is rotating, the pattern is read by a photo reflector (disk sensor) 31 provided at the camera body.

Reference number 4 indicates a motor for performing film feed and for opening and closing the light blocking door 26 of the cartridge 21. The rotation of the motor 4 is communicated to a planetary gear clutch mechanism PG via a gear train (not shown). The planetary gear clutch mechanism PG comprises a sun gear 3, a planetary gear 6, which interlocks with the sun gear 3, and a planetary arm 5 which links the two gears 3 and 6. With the rotation of the sun gear 3 in the clockwise direction, the planetary gear 6 becomes interlocked with a gear 7 to communicate motive power to a light blocking door opening and closing mechanism LDM, and with the rotation of the sun gear 3 in the counterclockwise direction, the planetary gear 6 becomes interlocked with a gear portion 10c of a rotating member 10 to communicate the film feed motive force to a fork 11.

The gear 7 is a constituent of the light blocking door opening and closing mechanism LDM, and a pin 7a that projects out from the gear 7 is connected to a longitudinal hole 9a formed at one end of a lever 9. The lever 9 is capable of oscillating around a shaft 9b and a pin 8a of a light blocking door opening and closing member 8 is connected to a longitudinal hole 9c formed at the other end of the lever 9. A fork portion 8c of the light blocking door opening and closing member 8 is connected to the light blocking door shaft 23 of the cartridge 21.

Figure 4:
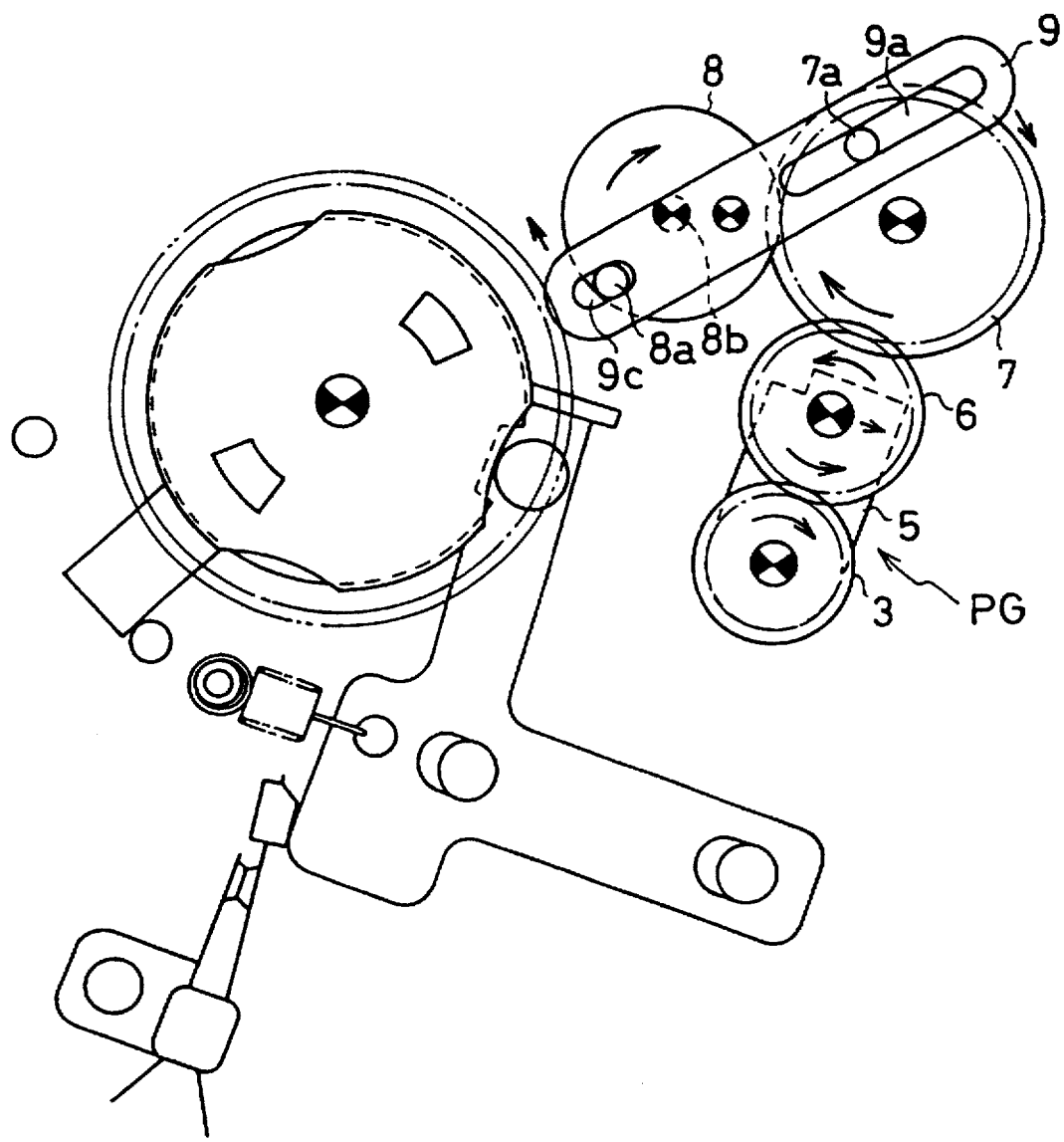
FIG. 4 illustrates the operation in which the light blocking door is open/close operated by the light blocking door opening and closing mechanism LDM shown in FIG. 1.
Figure 21:
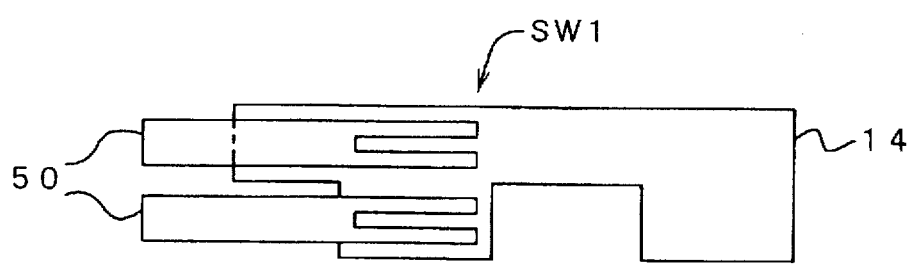
FIG. 21 is a development elevation showing the shape of a connection pattern of the switch SW1.

In the state shown in FIG. 1, when the gear 7 rotates a specific amount in the clockwise direction, the lever 9 oscillates to the position shown in FIG. 4 via the pin 7a and at this point the light blocking door opening and closing member 8 is caused to rotate a specific amount in the counterclockwise direction via the pin 8a. With this, the fork portion 8c causes the light blocking door shaft 23 to rotate to close the light blocking door 26. When the gear 7 further rotates in the clockwise direction from the state shown in FIG. 4, to return to the state shown in FIG. 1, the light blocking door 26 opens. The rotation position of the light blocking door opening and closing member 8, i.e., the open/closed state of the light blocking door 26, is detected by a light blocking door open/closed state detection switch SW1, which is constituted with a connection pattern 14 provided at the circumferential surface of the opening and closing member 8 and a brush 50 that is placed in contact with this pattern. The switch SW1 outputs a light blocking door open/closed state detection output signal LLS, shown in FIG. 13, in correspondence to the operation of the light blocking door drive mechanism LDM. Note that FIG. 21 shows the form of the connection pattern 14 in a 2-dimensional development.

Figure 3:
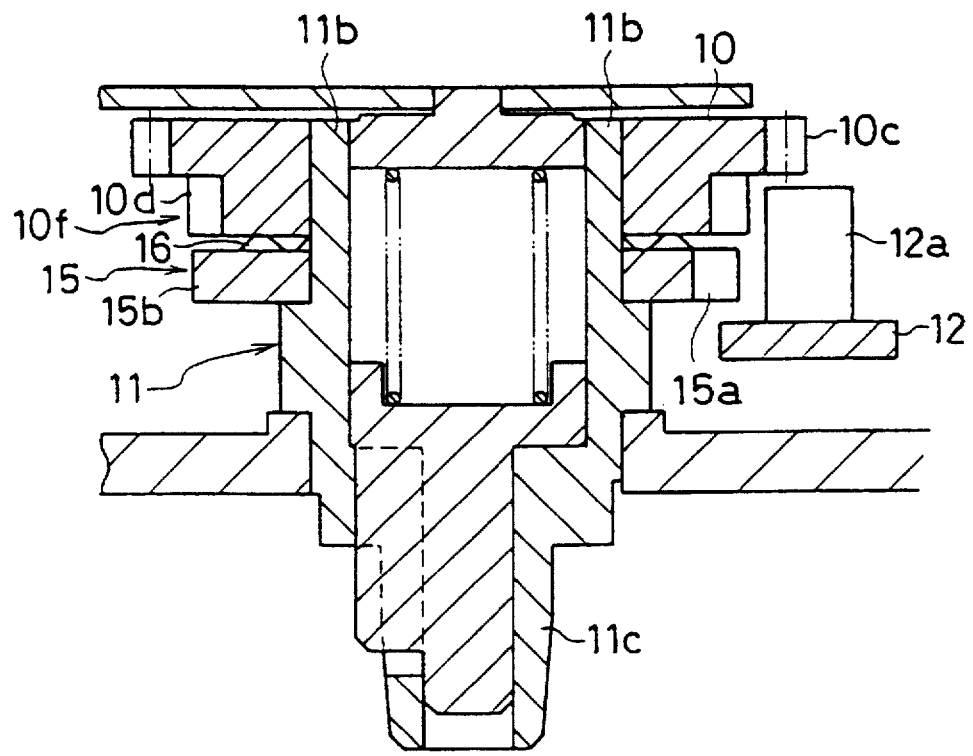
FIG. 3 is an cross section of the fork drive shown in FIG. 1.

The rotating member 10 mentioned earlier constitutes a spool shaft drive mechanism that can rotate around an X axis. A cam portion 10f is formed below the gear portion 10c as an integral part thereof and, at its cam surface 10d, indented portions 10e are formed at three locations. As shown in FIG. 3, too, a projected portion 11b of the fork member 11 is press-fitted at the rotating member 10 and because of this, the fork member 11 rotates together with the rotating member 10. A front end connecting portion 11c of the fork member 11 connects with the spool shaft 22 of the cartridge 21 and, with the rotation of the fork member 11, the spool shaft 22 is caused to rotate so that the film 24 is delivered from the cartridge 21 or it is wound back into the cartridge 21.

At the fork member 11, an oscillating cam 15, which has a somewhat smaller diameter than the cam portion 10f of the rotating member 10, is fitted loosely and coaxially and a wave washer 16 is provided between the oscillating cam 15 and the rotating member 10. The oscillating cam 15 initially rotates together with the rotating member 10 and the fork member 11 due to the frictional force provided by the wave washer 16. However, when an arm 15c(FIG. 1) projecting at the circumferential surface comes in contact with a stopper ST1 or ST2, its rotation becomes inhibited and subsequently, only the rotating member 10 and the fork member 11 rotate. An indented portion 15a is formed at one location at a circumferential surface (cam surface) 15b of the oscillating cam 15.

Figure 5:
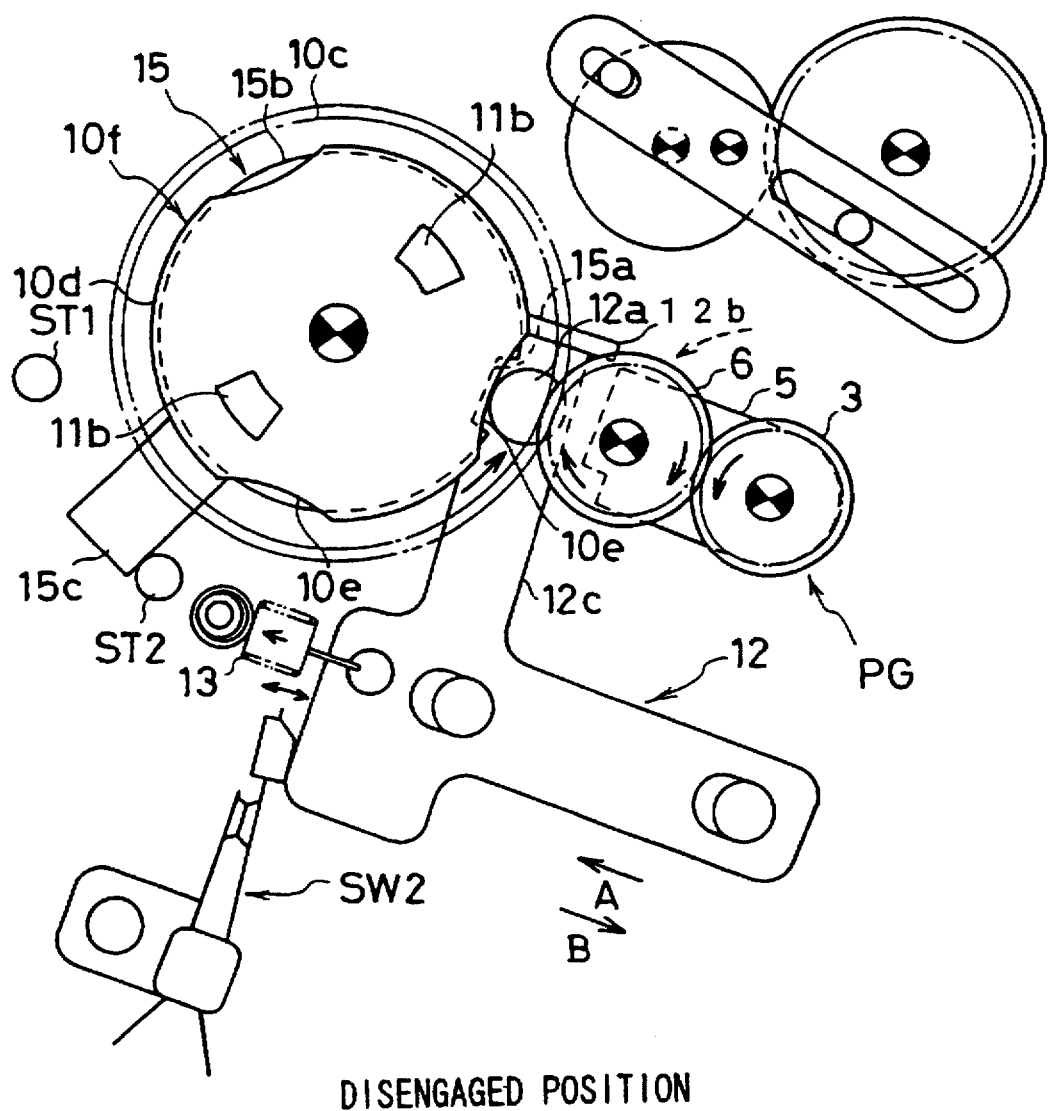
FIG. 5 shows a state in which the planetary gear clutch mechanism PG shown in FIG. 1 is at the disengaged position.
Figure 6:
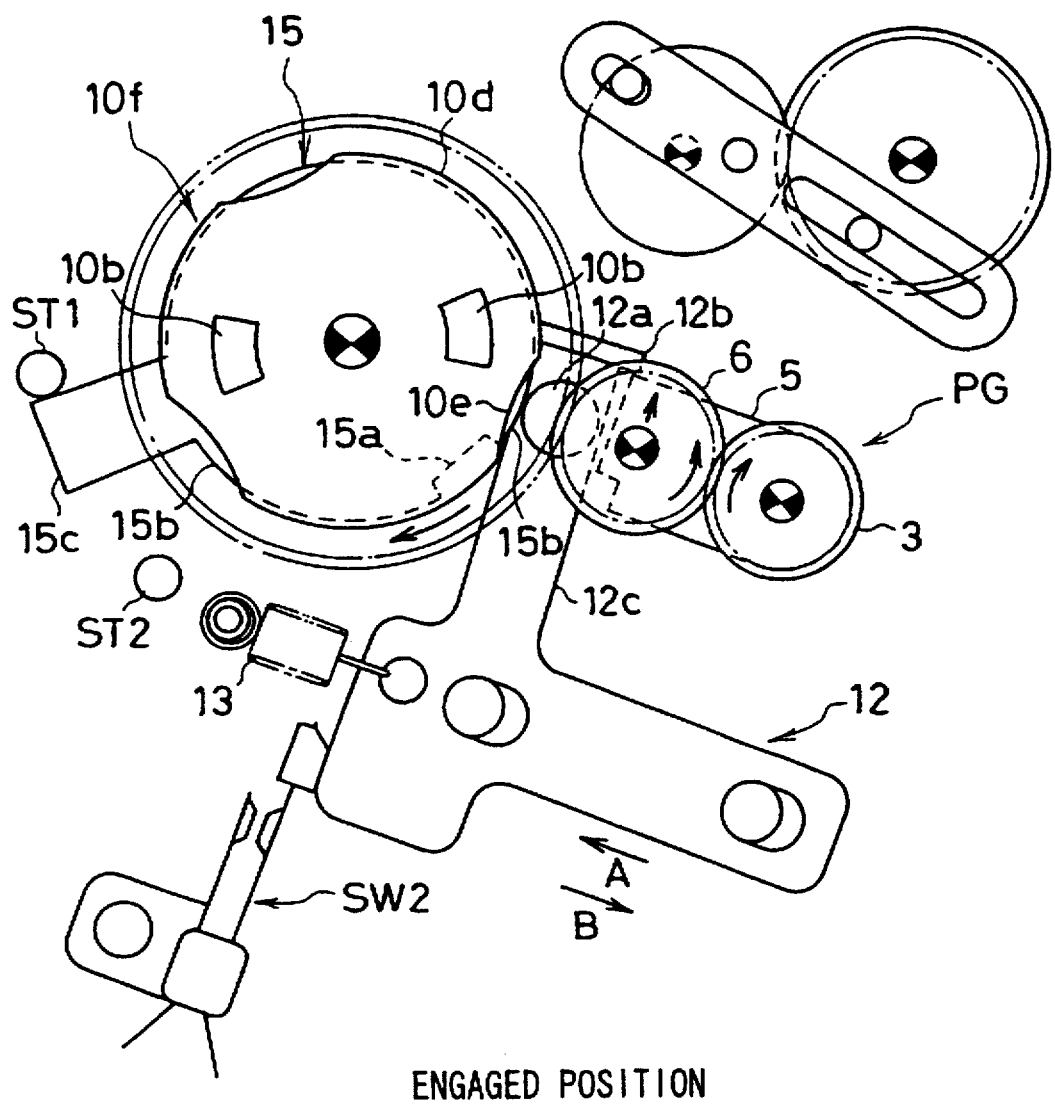
FIG. 6 shows a state in which the planetary gear clutch mechanism PG shown in FIG. 1 is at the engaged position.

Reference number 12 indicates a retaining member that is supported between an engaged position, shown in FIG. 6, and a disengaged position, shown in FIG. 5, in such a manner that it can move linearly in directions A and B, with a constant force being applied in direction A by a spring 13. A cam follower 12a and a stopper 12b project at the front end of an arm 12c that is provided projecting at the retaining member 12. A force is applied to the cam follower 12a by the spring 13, which applies a force to the retaining member 12 in the direction passing through the axis of the rotating member 10, and the circumferential surface of the cam follower is placed in contact with the cam surface 10d of the cam portion 10f of the rotating member 10 and the cam surface 15b of the oscillating cam 15.

FIG. 6 shows a state in which the retaining member 12 is at the engaged position and, in this state, since the stopper 12b is positioned in the path of movement of the planetary arm 5 of the planetary gear clutch mechanism PG, as shown in FIG. 6, the planetary arm 5 is obstructed by the stopper 12b and its rotation in the clockwise direction is prevented. In other words, even if the sun gear 3 rotates in the clockwise direction, the planetary gear 6 maintains a state in which it is interlocked with the gear portion 10c. On the other hand, when the retaining member 12 is at the disengaged position, as shown in FIG. 5, the stopper 12b is withdrawn from the path of movement of the planetary arm 5 of the planetary gear clutch mechanism PG and, consequently, the stopper 12b does not present any obstruction to the planetary arm 5 so that the planetary arm 5 rotates in the counterclockwise direction to allow the planetary gear 6 to become detached from the gear portion 10c.

The retaining member 12 is driven to the engaged position and the disengaged position in correspondence to the rotational phases of the rotating member 10 and the oscillating cam 15. Namely, when the oscillating cam 15 is prevented from rotating by one of the stoppers, i.e., the stopper ST2, as shown in FIG. 5, the indented portion 15a of the cam surface 15b faces opposite the cam follower 12a, and when an indented portion 10e of the rotating member 10 becomes aligned with the indented portion 15a in the direction of the X axis in this state, the cam follower 12a falls into the indented portion 10e and the indented portion 15a due to the force applied by the spring 13, causing the retaining member 12 to move from the engaged position to the disengaged position.

When, on the other hand, the oscillating cam 15 is prevented from rotating by the other stopper ST1, as shown in FIG. 6, or when one of the indented portions 10e of the rotating member 10 is not aligned with the indented portion 15a in the direction of the axis even if the oscillating cam 15 is prevented from rotating by the stopper ST2, the cam follower 12a does not fall into the indented portion 10e and the indented portion 15a and, consequently, the retaining member is held at the engaged position. Such positioning of the retaining member 12 is detected by a switch SW2, which is turned off when the retaining member 12 is at the engaged position and is turned on when it moves to the disengaged position.

When the motor 4 is rotated in reverse, the gear 3 is reversed, resulting in the planetary gear clutch mechanism PG oscillating in the counterclockwise direction. This causes the drive force to be communicated to the rotating member 10 of the fork drive mechanism, and the rotation of the rotating member 10 is reversed (counterclockwise direction) to cause the oscillating cam 15 and the bar code disk 25 to be reversed, too. The rotating member 10 continues to rotate in the reverse direction even after the oscillating cam 15 connects with the stopper ST2 and its rotation is stopped and, as shown in FIG. 6, the cam follower 12a of the connecting member 12 disengages from the indented portion 15a of the oscillating cam 15. This causes the connecting member 12 to slide in direction B and its stopper 12b projects out in the path of movement of the planetary arm 5 to stop the oscillation of the planetary gear clutch mechanism PG in the clockwise direction. The switch SW2 is turned off at this point. If the gear 3 is caused to rotate in the forward direction by rotating the motor 4 in the forward direction at this time, the gear 6 maintains the state in which it is interlocked with the gear 10c since the planetary gear mechanism PG is prevented from oscillating by the stopper 12b, and the rotating member 10 rotates in the forward direction, as shown in FIG. 6, to feed the film.

FIGS. 7–12 show the operational sequence of the gear 7, the light blocking door opening and closing member 8 and the lever 9 when the light blocking door 26 is driven to become closed→open→closed and the operating state of the light blocking door switch SW1 at each operational step in the sequence. In reference to these drawings, the opening/closing operation of the light blocking door effected by the light blocking door opening and closing mechanism is explained in detail.

When the cartridge chamber lid is closed after a cartridge is loaded, the motor 4 is driven to rotate in the forward direction and the gear 3 rotates in the clockwise direction (forward direction) via a drive gear system (not shown). With the forward rotation of the gear 3, the planetary gear clutch mechanism PG oscillates in the counterclockwise direction and the drive force of the motor 4 is communicated to the gear 7 via the gear 6 so that the gear 7 starts to rotate in the clockwise direction. With the rotation of the gear 7, the pin 7a provided projecting out from the gear 7 causes the lever 9 to oscillate in the counterclockwise direction and the pin 8a connected with the lever 9 causes the light blocking door opening and closing mechanism 8 to rotate. As long as this rotation is sustained, the operation of the light blocking door opening and closing mechanism LDM repeatedly goes through the states shown in FIG. 12→FIG. 11→FIG. 10→FIG. 9→FIG. 8→FIG. 7→FIG. 12→in that order.

Figure 9:
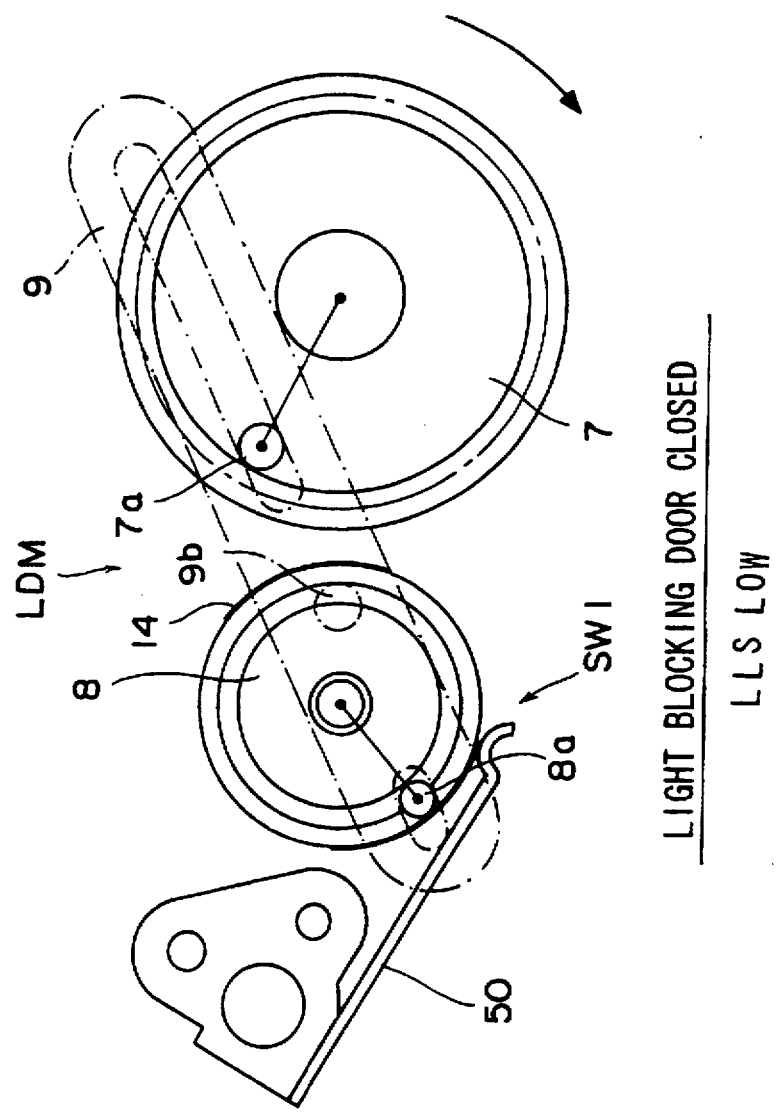

FIG. 9 shows a state immediately after the cartridge 12 is loaded in the cartridge chamber and the cartridge chamber lid is closed. At this point, the light blocking door 26 is in a closed state and the level of the output signal LLS from the switch SW1 is at 0(Time point T3 in FIG. 13).

Figure 8:
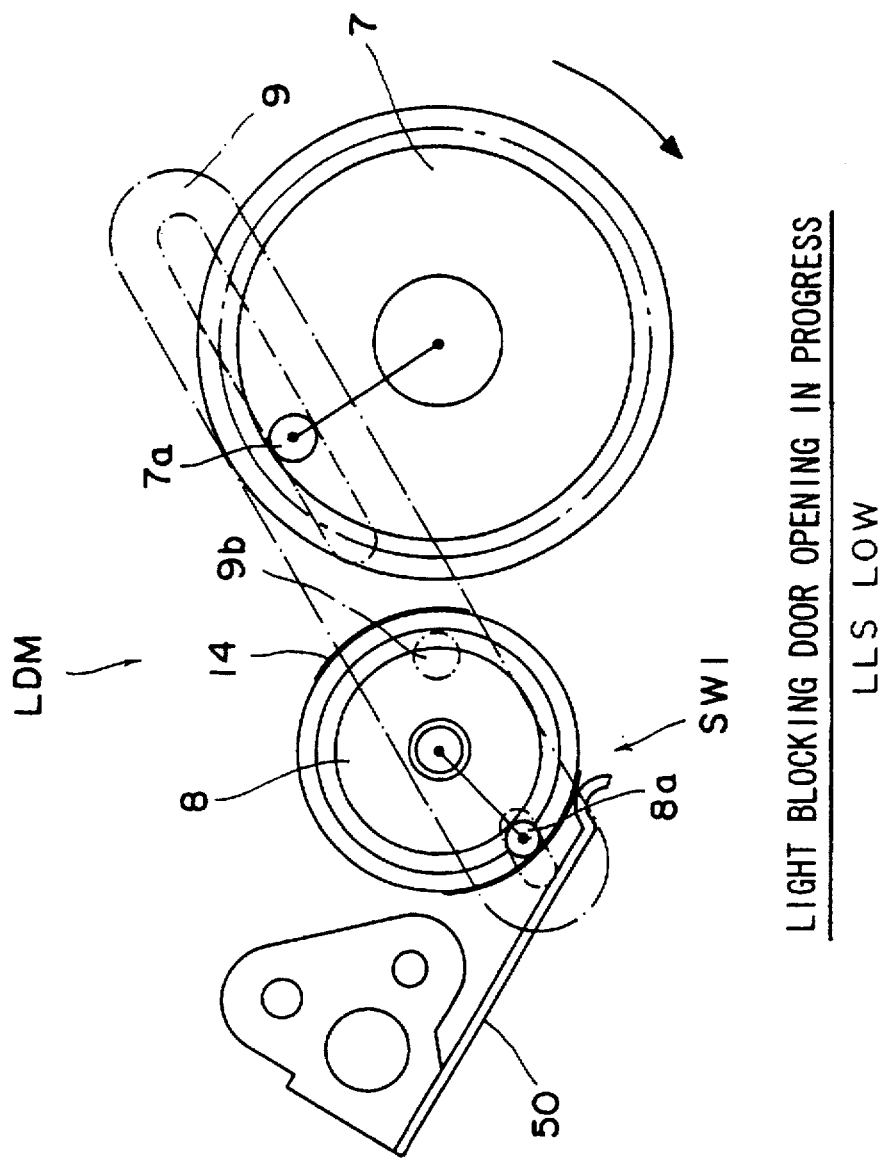

FIG. 8 shows a state in which the gear 7 has rotated by a specific amount in the clockwise direction from the state shown in FIG. 9, i.e., a state during the opening operation of the light blocking door 26. Although the light blocking door 26 is in the process of being opened, it is still in the closed state and the level of the output signal LLS from the switch SW1 is at 0(time point T2 in FIG. 13).

Figure 7:
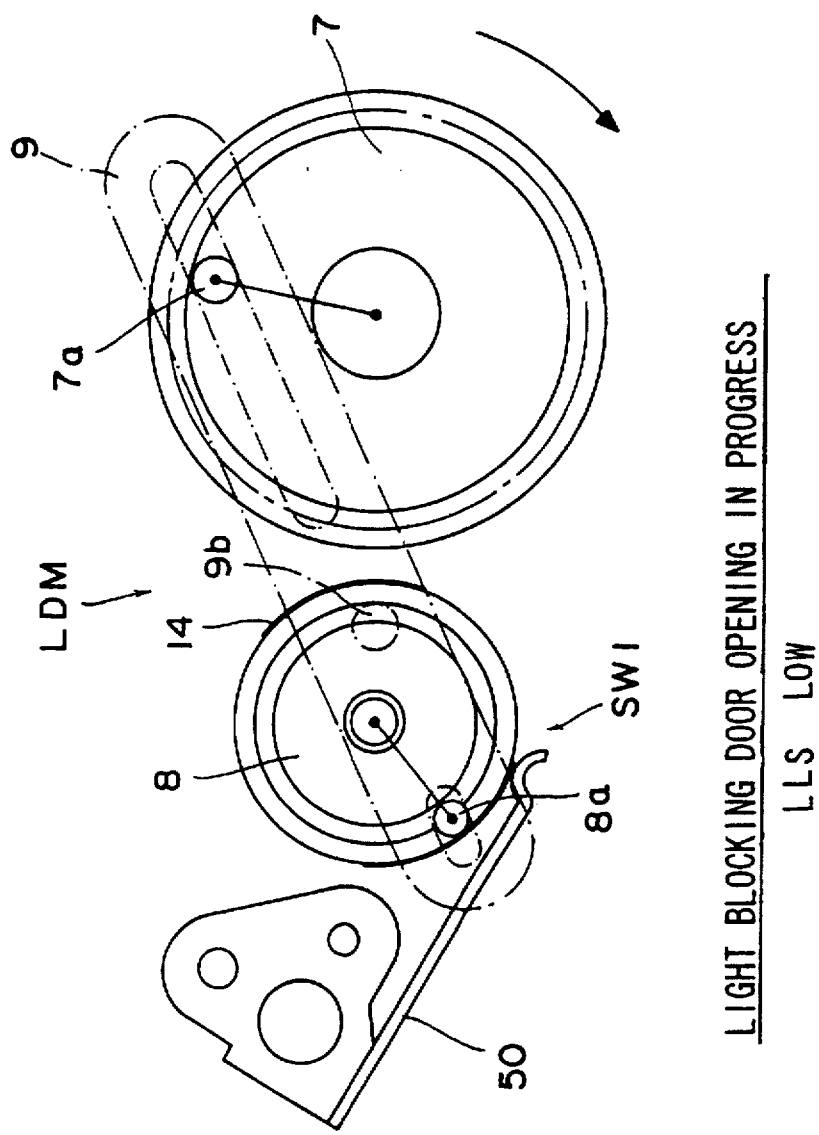
FIGS. 7~12 illustrate the operation of the light blocking door opening and closing mechanism LDM shown in FIG. 1.

FIG. 7 shows a state in which the gear 7 has further rotated by a specific amount in the clockwise direction from the state shown in FIG. 8. Although the light blocking door 26 is in the process of being opened, it is still in the closed state, and the level of the output signal LLS from the switch SW1 is at 0(time point T1 in FIG. 13).

Figure 12:
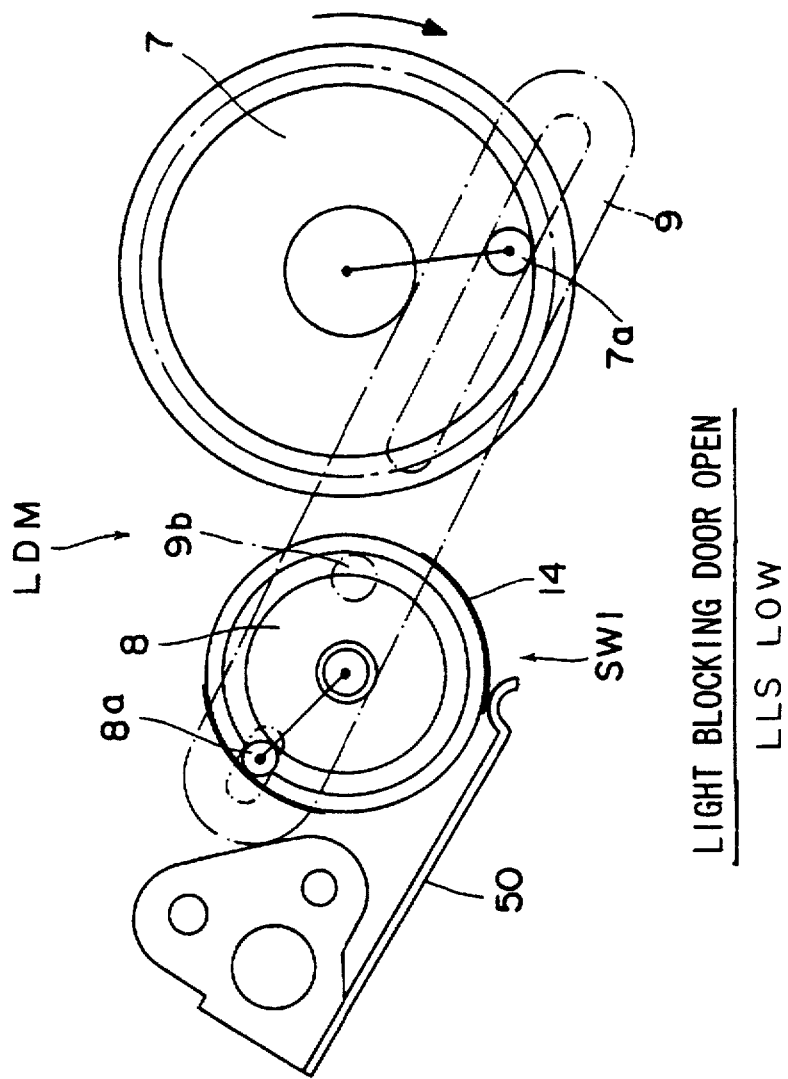

FIG. 12 shows a state in which the gear 7 has further rotated in the clockwise direction from the state shown in FIG. 7, i.e., a state immediately after the light blocking door 26 enters the open state. During the process in which the light blocking door 26 shifts from the state shown in FIG. 7 to the state shown in FIG. 12, the level of the output signal LLS from the switch SW1 rises from 0 to 1 and in the state shown in FIG. 12, it falls to 0(time point T6 in FIG. 13).

Figure 11:
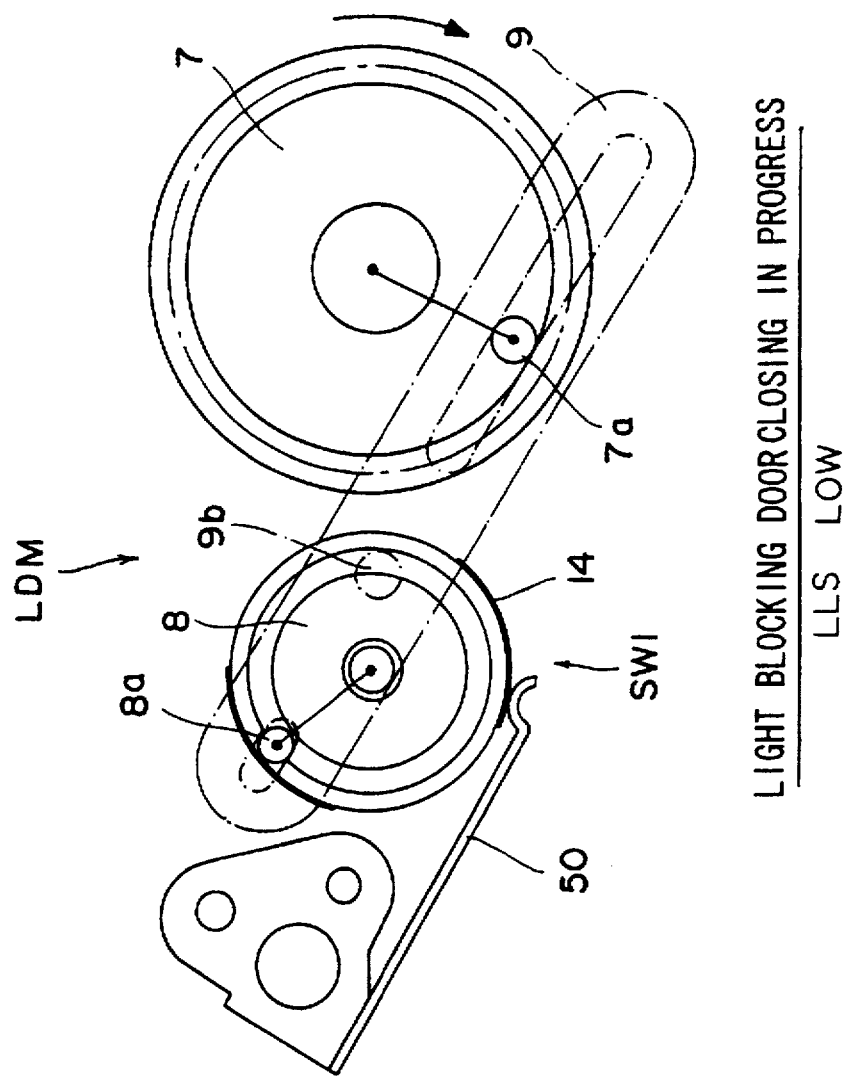

FIG. 11 shows a state in which the gear 7 has rotated by a specific amount in the clockwise direction from the state shown in FIG. 12, i.e., a state during the closing operation of the light blocking door 26. Although the light blocking door 26 is in the process of being closed, it is still in the open state and the level of the output signal LLS from the switch SW1 remains at 0(time point T5 in FIG. 13).

Figure 10:
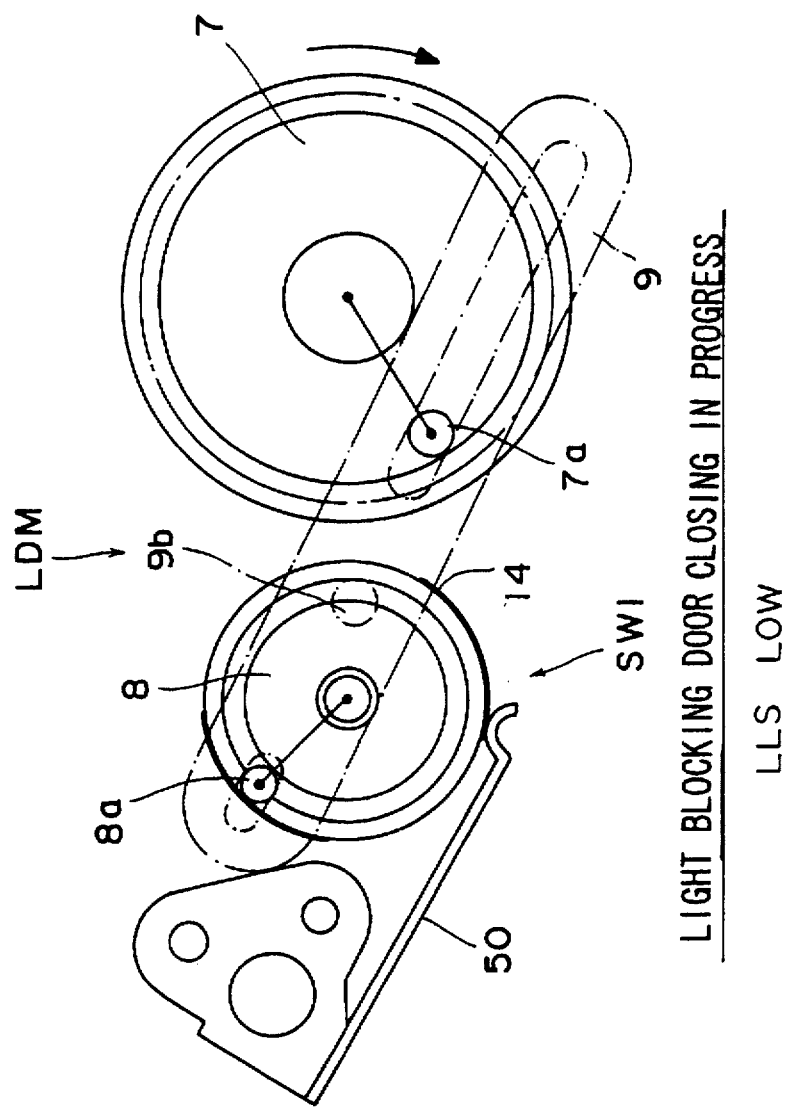

FIG. 10 shows a state in which the gear 7 has further rotated by a specific amount in the clockwise direction from the state shown in FIG. 11. Although the light blocking door 26 is in the process of being closed, it is still in the open state and the level of the output signal LLS from the switch SW1 remains at 0(time point T4 in FIG. 13). When the gear 7 further rotates in the clockwise direction from the state shown in FIG. 10, the state shown in FIG. 9 is achieved. During the process in which the light blocking door shifts from the state shown in FIG. 10 to the state shown in FIG. 9, the output signal LLS from the switch SW1 rises from 0 to 1 and falls to 0 in the state shown in FIG. 9.

Figure 13:
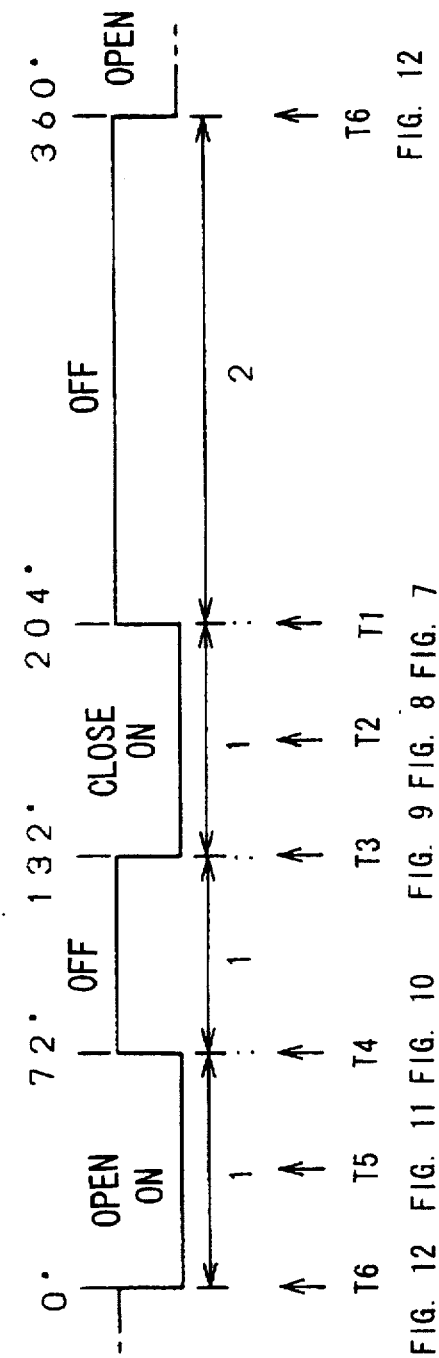
FIG. 13 is a signal waveform diagram of the light blocking door open/closed state detection signal LLS during the operation illustrated in FIGS. 7~12.

Since the rotation of the gear 7 is converted to the oscillating movement of the lever 9 to be communicated to the light blocking door opening and closing member 8, even when the gear 7 of the light blocking door opening and closing mechanism LDM rotates at a constant rate, the rotating rate of the light blocking door opening and closing mechanism 8 is not constant and the waveform of the output signal LLS from the light blocking door switch SW1 is repeatedly output as shown in the time chart in FIG. 13. In this embodiment, the positional relationships among the gear 7, the light blocking door opening and closing member 8 and the lever 9 are set to ensure that the ratio of the time interval from the time point T6 to T4, the time interval from the time point T4 to T3, the time interval from the time points T3 to T1 and the time interval from the time point T1 to T6 of the output signal LLS from the light blocking door switch SW1 is approximately at 1:1:1:2. In this embodiment, a decision is made in regard to the open/closed state of the light blocking door 27 based upon different lengths of time over which the light blocking door switch SW1 remains off, shown in the time chart. Following the long period of time the switch remains off (T1–T6), the light blocking door 26 is in an open state and following the short period of time over which it remains off (T4–T3), the light blocking door 26 is in a closed state.

Figure 14:
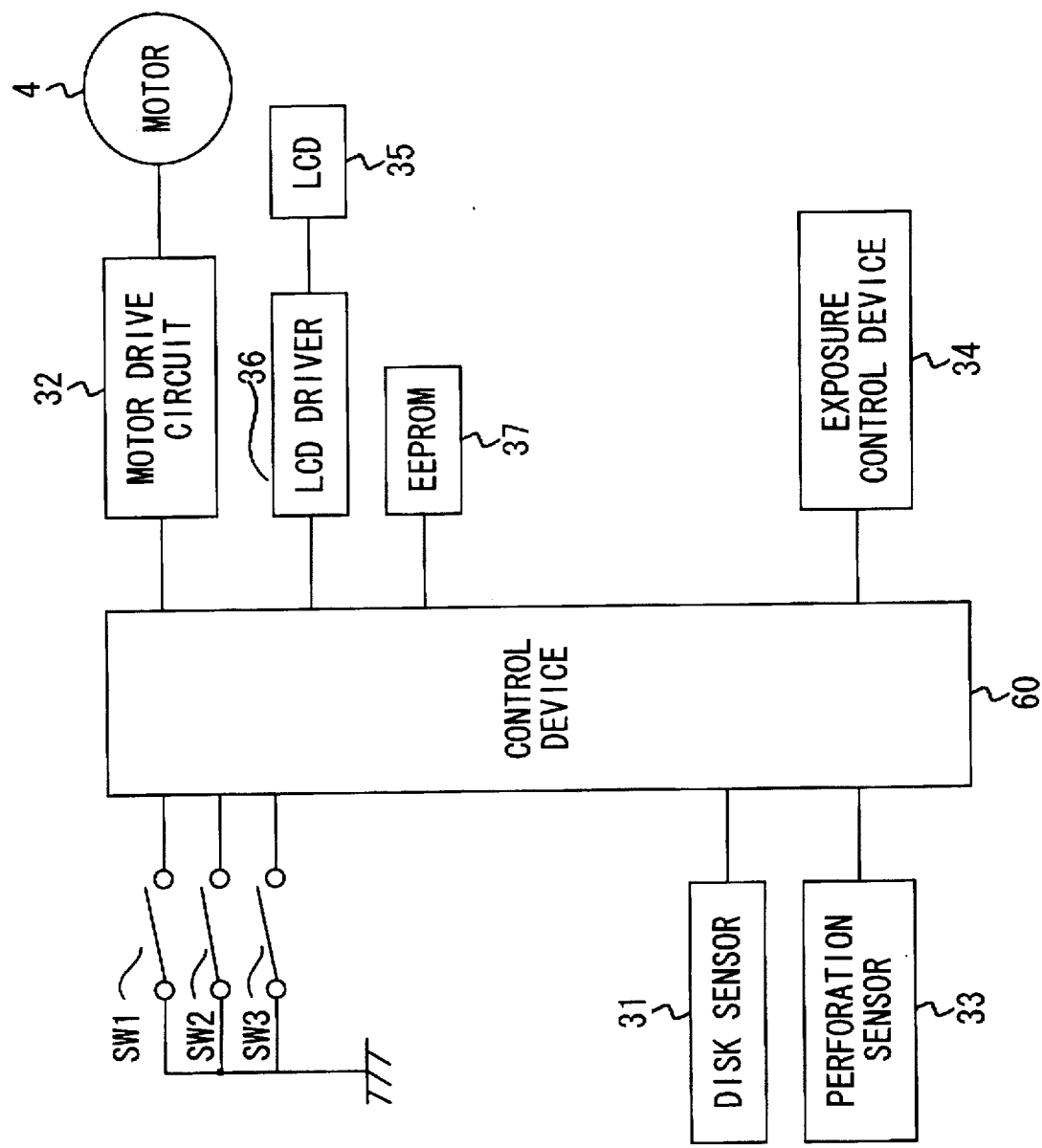
FIG. 14 is a block diagram showing the first and second embodiments of the control device in the light blocking door opening and closing mechanism according to the present invention.

FIG. 14 shows an example of the structure of the control system in a camera provided with the light blocking door opening and closing apparatus described above. Reference number 60 indicates a control device that includes a CPU, a timer, a RAM, a ROM and the like, and controls the sequence of the camera. The program presented in the flowchart, which is to be explained in detail later, represents the portion of the program installed in the ROM of the control device 60 that is relevant to this embodiment. The switch SW1 for detecting the open/closed state of the light blocking door 26 described above, the switch SW2 for detecting the position of the retaining member 12, a switch SW3 for detecting the open/closed state of the lid of the cartridge chamber, a photoreflector (disk sensor) 31 for reading information related to the film from the cartridge, a motor drive circuit 32 for driving the motor 4, a photoreflector (perforation sensor) 33 for performing film feed control, an exposure control device 34, a driver 36 of a liquid crystal display device (LCD) 35 for displaying various types of photographic information and an EEPROM 37 for storing in memory the open/closed state of the light blocking door 26 are connected to the control device 60.

Figure 15:
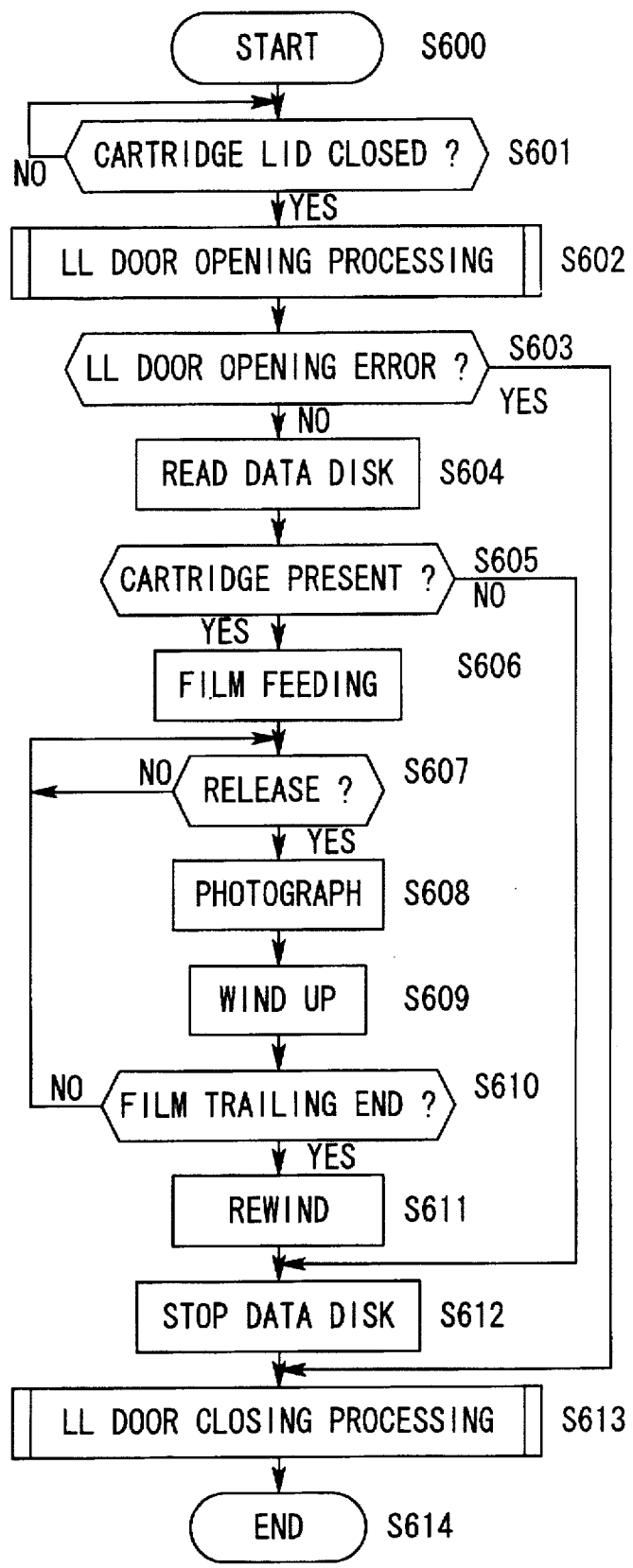
FIG. 15 is a flowchart of the main routine in the first embodiment according to the present invention.

In reference to FIGS. 15–20, the processing sequence followed in taking photographs with a camera provided with the opening and closing apparatus according to the present invention is explained. FIG. 15 is the main flowchart, whereas, FIGS. 16–20 are flowcharts illustrating steps in the flowchart shown in FIG. 15 that require detailed explanation. These programs are stored in the ROM inside the control device 60 shown in FIG. 14 and are executed by the CPU.

(Main routine)

The program shown in FIG. 15 starts at step S600 when the power switch (not shown) of the camera is turned on. When it is decided that the cartridge chamber lid (not shown), which opens and closes the cartridge chamber, has shifted from an open state to a closed state, an affirmative decision is made in step S601. The decision in regard to the shifting of the cartridge chamber lid from the open state to the closed state is made by verifying that the cartridge chamber lid open/closed switch SW3 has shifted from on to off. After detecting that the cartridge chamber lid is closed, the operation remains in standby for a specific length of time before executing the light blocking door opening processing for the cartridge 21 (step S602). Although its details are to be given later, it is to be noted that the light blocking door opening processing is always performed while the cartridge chamber lid (not shown) is closed.

When the light blocking door 26 is opened through the opening processing performed in step S602, an affirmative decision is made in step S603 and the operation proceeds to step S604, whereas, if an error of any kind occurs during the operation through which the light blocking door 26 is opened, a negative decision is made in step S603 before the operation proceeds to step S613. The decision making in step S603 is performed based upon the state of a light blocking door error flag in the light blocking door opening processing, which is to be detailed later.

When the light blocking door 26 is opened, the data disk 25 of the cartridge 21 is read (step S604). In other words, with the motor 4 rotating in the reverse direction and the data disk 25 caused to rotate in the counterclockwise direction in the state shown in FIG. 5 and the bar code pattern is read by the photoreflector 31. By reading the data disk 25, the exposure state of the film 24 and information related to the film 24 (ISO sensitivity, the total number of frames on the film) is acquired.

Then, in step S605, the state of film usage is determined, based upon the film information thus read, and if it is decided that there are still unexposed frames remaining on the film, the operation proceeds to step S606. It is to be noted that if the data disk 25 has not been read, i.e., when no cartridge 21 has been loaded, when there are no unexposed frames remaining or when information related to the film cannot be read, the operation proceeds to step S612, to perform stopping processing for the data disk 25.

If the reading of the data disk 25 is completed normally in step S604, film feed is performed (step S606). Namely, by rotating the gear 3 in the reverse direction, the planetary gear 6 is interlocked with the gear 10c as shown in FIG. 6, so that the rotational force can be communicated to the rotating member 10. With this, the fork member 11 rotates and the film 24 is fed from the cartridge 21. When the first frame of the film is positioned at the specific photographing position, the film is stopped and the operation waits for a shutter release operation to be performed in step S607.

When the shutter release operation is performed, photographing of the first frame is effected (step S608). When the photographing is completed, the film 24 is wound up by one frame and, at the same time, various types of data are magnetically recorded on the film (step S609).

In step S610, a decision is made as to whether the film has been wound up correctly by one frame and the next frame has stopped at the photographing position or the film has reached its trailing end and, consequently, winding up by one frame has not been completed. If the film 24 has been wound up by one frame, the operation returns to step S607 to again wait for a shutter release, and if the winding up has not been completed, i.e., if the trailing end of the film is detected, the operation proceeds to step S611.

In step S611, the film 24 is rewound. When the entire film 24 is wound into the cartridge 21 and the rewind is completed, the operation proceeds to step S612, in which the data disk 25 is operated to rotate to the exposed position and then it is stopped. After this, the closing processing for the light blocking door 26 is executed (step S613). Details of this processing are to be explained later. It should be noted, however, that this processing is performed only when the cartridge chamber lid (not shown), is closed. It should also be noted that the closing processing for the light blocking door 26 is also executed when the opening processing for the light blocking door 26 has not been performed normally and when the cartridge chamber lid has been closed without a cartridge 21 inserted. Then, the operation proceeds to step S614 and the operation of the camera ends.

The LCD 35 displays "E" before the cartridge chamber lid is opened, displays "—" during the opening operation of the light blocking door 26, displays "—" while reading of the data disk 25 is in progress, displays "—" during a film thrust, displays the frame number during photographing, displays "—" during rewind, displays "—" during the closing operation of the light blocking door 26 and displays "E" after the light blocking door 26 has been driven.

(Light Blocking Door Opening Processing)

Figure 16:
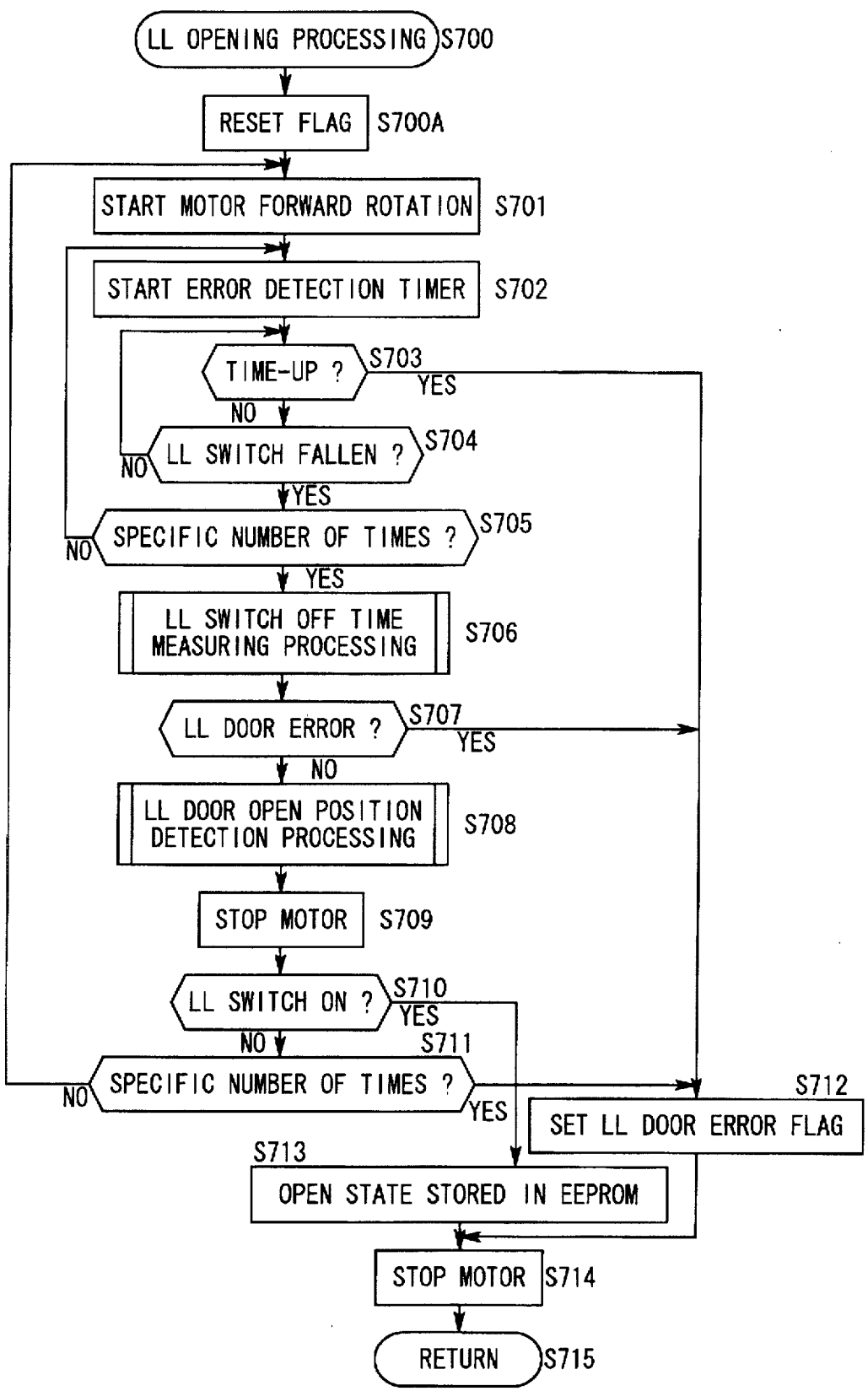
FIG. 16 is a flowchart of the light blocking door opening processing.
Figure 17:
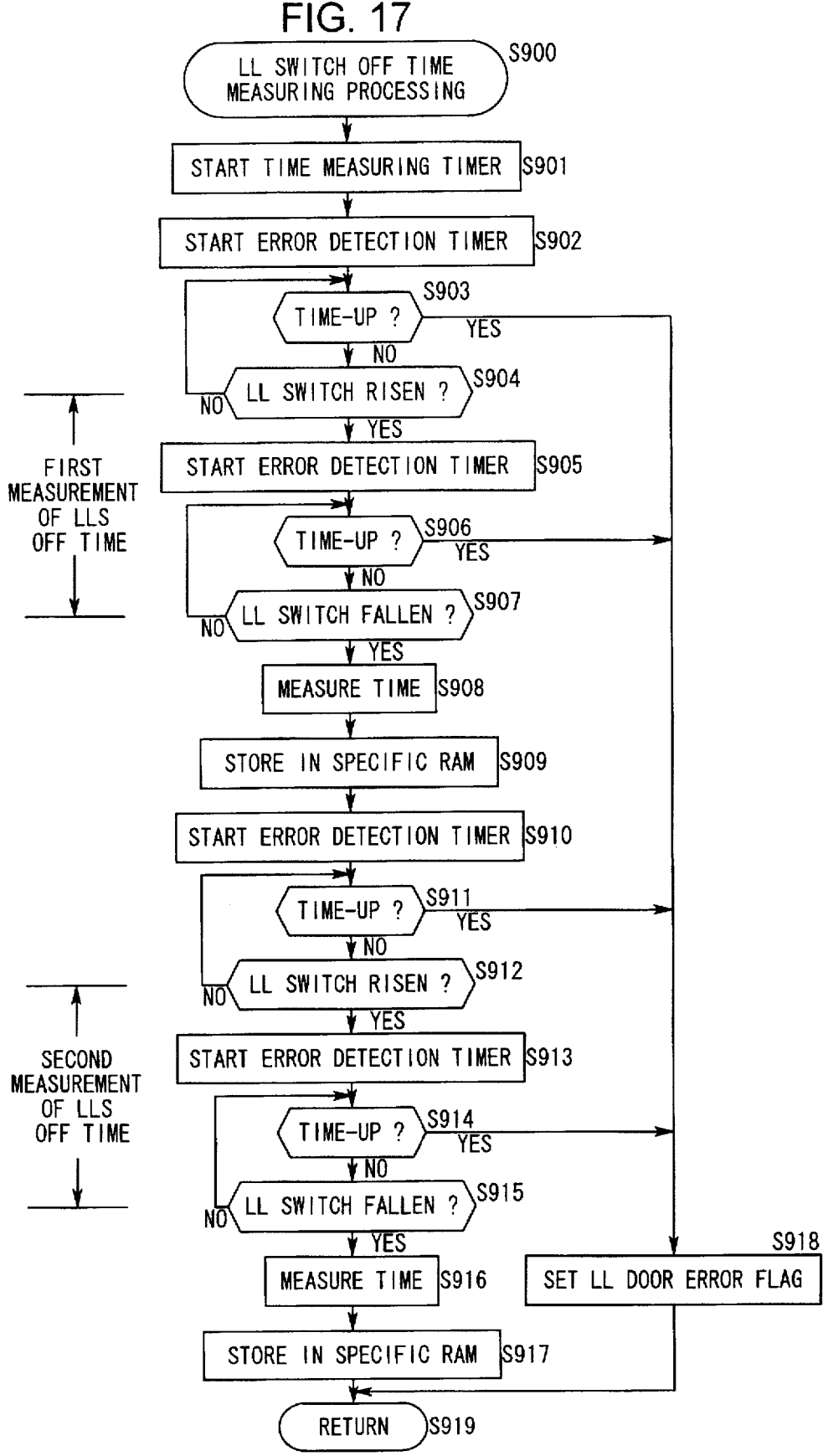
FIG. 17 is a flowchart of the light blocking door switch off time measurement processing.
Figure 18:
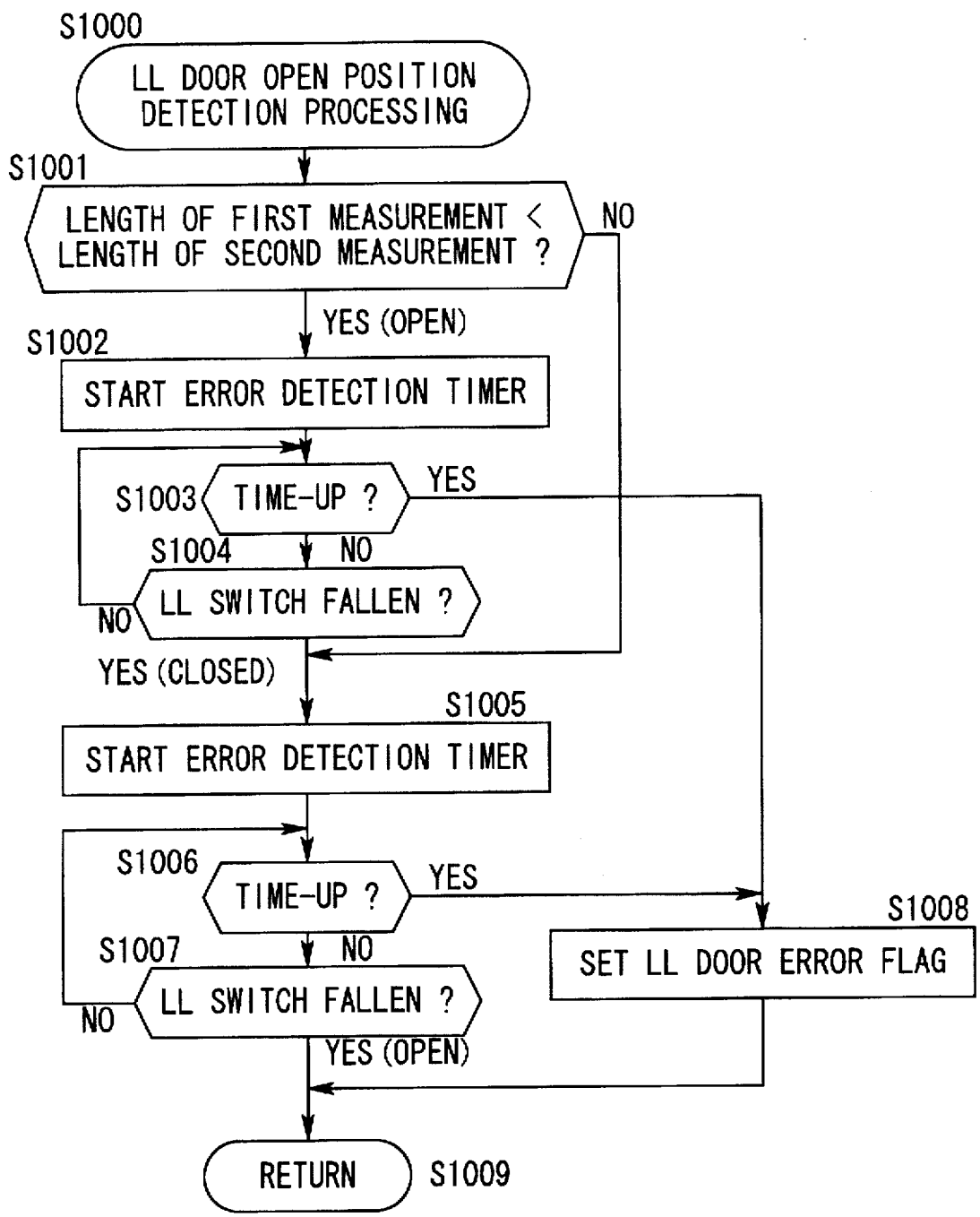
FIG. 18 is a flowchart of the light blocking door open position detection processing.

In reference to FIGS. 16–18, the light blocking door opening processing (step S602) in FIG. 15 is explained in detail.

The program shown in FIG. 16 is executed when a call is made in step S602 in FIG. 15 (step S700). The CPU of the control device 60 first resets the light blocking door error flag in step S700A and then sends a signal to the motor drive circuit 32 to cause the motor 4 to rotate in the forward direction (step S701). With the motor thus driven, the gear 3 of the planetary gear clutch mechanism PG is caused to rotate in the clockwise direction and the gear 7 of the light blocking door opening and closing mechanism LDM is driven via the gear 6.

Next, a timer which measures the length of time over which the output signal LLS is not output from the light blocking door open/closed state detection switch SW1 (hereafter referred to as the LLS non-detector timer) is set and started (step S702). Then, a verification is made as to whether or not the time has elapsed at the LLS non-detection timer (step S703). If a time-up has occurred, it is decided that a fall of the output signal LLS has not been verified within a specific period of time, i.e., that an error has occurred, and the operation proceeds to step S712 to set the light blocking door error flag. In step S714, the motor 4 is stopped and the operation returns to step S602 in FIG. 15 from step S715.

If a time-up has not occurred at the LLS non-detection timer in step S703, a verification of a fall of the output signal LLS (from off to on) is made (step S704). When it is verified that the signal LLS has fallen, the operation proceeds to step S705. Otherwise, the operation returns to step S703.

In step S705, a verification is made as to whether or not the number of times a fall has been verified matches a specific number. If the number of times such verification has been made is a specific value (twice, in this embodiment), it is decided that the rotation of the light blocking door opening and closing mechanism LDM has stabilized and the operation proceeds to step S 706. If the number of times the verification has been made is fewer than twice, the operation proceeds to step S702 again to update the LLS non-detection timer for a restart.

If the fall of the output signal LLS is verified twice in step S705, a call is made for the light blocking door switch off time measuring processing (step S706). This processing is to be detailed later. When the light blocking door switch off time measuring processing is completed, the operation proceeds to step S707, in which a decision is made as to whether or not an error has been detected during the light blocking door switch off time measuring processing. If an error has been detected, the operation proceeds to step S712 to set the light blocking door error flag. After this, the motor 4 is stopped in step S 714 and the operation returns from step S715 to step S602 in FIG. 15.

When it is decided that the light blocking door switch off time measuring switch processing has been completed normally, a call is made for the light blocking door open position detection processing (step S708). The details of the light blocking door open position detection processing are to be given later. If it is detected that the light blocking door is at the open position in step S708, the motor 4 is stopped (step S709). Namely, by reversing the rotation of the motor 4 for a specific length of time, a reverse power break is applied and then the motor 4 is shut down by applying a shorting break through shorting the motor 4 for a specific length of time. After the motor 4 is stopped, the state of the output signal LLS is verified (step S710). If it is verified in step S710 that the output signal LLS is in an on state (0 level), it is decided that the light blocking door 26 is definitely at the open position and the information that the light blocking door 26 is in an open state is stored in the EEPROM 45 (step S713). Then, the motor stopping processing is performed in step S714 and the operation returns from step S715 to step S602 in FIG. 15.

If a negative decision is made in step S710, i.e., if the output signal LLS is in an off state, it is decided that the light blocking door 26 is not at the open position and the operation proceeds to step S711, in which a verification is made as to whether or not the number of times a negative decision has been made in step S710 is a specific value. If the number of times the processing has been performed is at a specific value, i.e., twice, for instance, the operation proceeds to step S712 to set the light blocking door error flag. After this, the operation proceeds from step S714 to step S715 to end the light blocking door opening processing before it returns to step S602, shown in FIG. 15. If it is decided that the number of times the verification has been made has not reached the specific value in step S711, the operation returns to step S701 to repeat the processing described above.

(Light Blocking Door Switch Off time Measuring Processing)

FIG. 17 is a detailed flowchart of the light blocking door switch off time measuring processing performed in step S706 in FIG. 16. During this light blocking door switch off time measuring processing, the length of time over which the signal LLS output from the switch SW1 remains in an off state (level 1) during one rotation of the gear 7 is measured. In this embodiment, the signal LLS is set in an off state twice while the light blocking door opening and closing member rotates once, as shown in FIG. 13, and the lengths of these two off states are measured.

First, a timer for measuring the length of time over which the output signal LLS remains off is set and started (step S901). Next, the LLS non-detection timer is set and started (step S902). In step S903, a decision is made as to whether or not a time-up has occurred at the LLS non-detection timer, which has been started in the step S902. If it is decided that a time-up has occurred at the LLS non-detection timer, the operation proceeds to step S918 to set the light blocking door error flag. Then the operation returns from step S919 to step S706 in FIG. 16.

If a time-up has not occurred at the LLS non-detection timer in step S903, a verification of a rise of the output signal LLS (from on to off) is made (step S904). If a rise of the output signal LLS is verified, the operation proceeds to step S905. If, on the other hand, a rise of the output signal LLS cannot be verified, the operation returns to step S903.

If a rise of the output signal LLS is verified in step S904, the LLS non-detection timer is set and started again step (S905). Next, a verification is made as to whether or not a time-up has occurred at the LLS non-detection timer, which has been started in step S905 (step 906). If a time-up has occurred at the LLS non-detection timer, the operation proceeds to step 918 to set the light blocking door error flag. Then, the operation proceeds to step S919 to end the light blocking door switch off time measuring processing and the operation returns to step S706 shown in FIG. 16.

If a time-up has not occurred at the LLS non-detection timer in step S906, a verification of a fall of the output signal LLS is made (step S907). If a fall of the output signal LLS cannot be verified, the operation returns to step S906. If, on the other hand, a fall of the output signal LLS is verified in step S907, the length of time over which the output signal LLS remains off, i.e. the length of time elapsing from the rise until the fall, is measured based upon the measured value in the time measuring timer that has been started in step S901 (step 908). The value thus measured is stored in the RAM of the CPU in the control device 60 (step S909). The value measured at this time is used as the first measured length of time.

Next, the LLS non-detection timer is set and started again (step S910). A verification is made as to whether or not a time-up has occurred at the LLS non-detection timer, which has been started in step S910 (step S911). If a time-up has occurred at the LLS non-detection timer, the operation proceeds to step S918 to set the light blocking door error flag. Then the operation returns from step S919 to step S706, shown in FIG. 16. If a time-up has not yet occurred in the LLS non-detection timer in step S911, a verification of a rise of the output signal LLS (step S912) is made. If a rise of the output signal LLS is verified, the operation proceeds to step S913, whereas, if a rise change in the output signal LLS cannot be verified, the operation proceeds to step S911.

If a rise of the output signal LLS has been verified in step S912, the LLS non-detection timer is set and started again (step S913). Next, a verification is made as to whether or not a time-up has occurred at the LLS non-detection timer (step S914). If a time-up has occurred at the LLS non-detection timer, the operation proceeds to step S918 to set the light blocking door error flag and the operation returns from step S919 to step S706, shown in FIG. 16. If, on the other hand, a time-up has not occurred at the LLS non-detection timer in step S914, a verification of a fall of the output signal LLS is made (step S915). If a fall of the output signal LLS is verified, the operation proceeds to step S916. If, on the other hand, a fall of the output signal LLS cannot be verified, the operation proceeds to step S914.

If a fall of the output signal LLS has been verified in step S915, the length of time over which the output signal LLS remains off, i.e., the length of time elapsing from the rise until the fall, is measured through processing similar to that performed in step S908 (step S916 ). The value thus measured is stored in the RAM of the CPU in the control device 60 (step S917). The value measured at this time is set as the second measured length of time. After this, the operation returns to the processing shown in FIG. 16 from step S919.

(Light Blocking Open position Detection processing) FIG. 18 is a detailed flowchart of the light blocking door open position detection processing performed in step S708 in FIG. 16. During this light blocking door open position detection processing, the current state of the light blocking door 26 is verified by comparing two lengths of time over which the signal LLS output from the switch SW1 remains off during one rotation of the gear 7 and the light blocking door 26 is driven from the current position to the open position.

First, the first and second measured lengths of time stored in the RAM in step S706 in FIG. 16 are read for comparison (step S1001). If the length of the first off time is greater than that of the second off time, i.e., if the light blocking door 26 is currently at the closed position, the operation proceeds to step S1005 in order to count the fall of the output signal LLS once. If, on the other hand, the length of the first off time is smaller than that of the second off time, i.e., if the light blocking door 26 is currently at the open position, the operation proceeds to step S1002 in order to count the fall of the output signal LLS twice.

In step S1002, the LLS non-detection timer is set and started. A verification is made as to whether or not a time-up has occurred at the LLS non-detection timer (step S1003), and if a time-up has occurred, the operation proceeds to step S1008 to set the light blocking door error flag. Then, the operation returns from step S1009 to step S708 shown in FIG. 16. If a time-up has not occurred at the LLS non-detection timer in step S1003, a verification of a fall of the output signal LLS is made (step S1004). When the fall of the output signal LLS is verified, the operation proceeds to step S1005. If, on the other hand, the fall of the output signal LLS cannot be verified, the operation proceeds to step S1003.

If the fall of the output signal LLS has been verified in step S1004, the LLS non-detection timer is set and started again (step S1005). If it is decided that the first LLS off time is greater than the second LLS off time in step S1001 too, the operation proceeds to step S1005. In step S1006, a verification is made as to whether or not a time-up has occurred on the LLS non-detection timer which has been started in step S1005. If a time-up has occurred at the LLS non-detection timer, the operation proceeds to step S1008 to set the light blocking door error flag in the same manner as that described above. Then the operation returns from step S1009 to step S708 shown in FIG. 16.

If a time-up has not occurred at the LLS non-detection timer in step S1006, a verification of a fall of the output signal LLS is made, (step S1007). If the fall of the output signal LLS has been verified, the operation returns from step S1009 to step S708 shown in FIG. 16.

(Light Blocking Door Closing processing)

Figure 19:
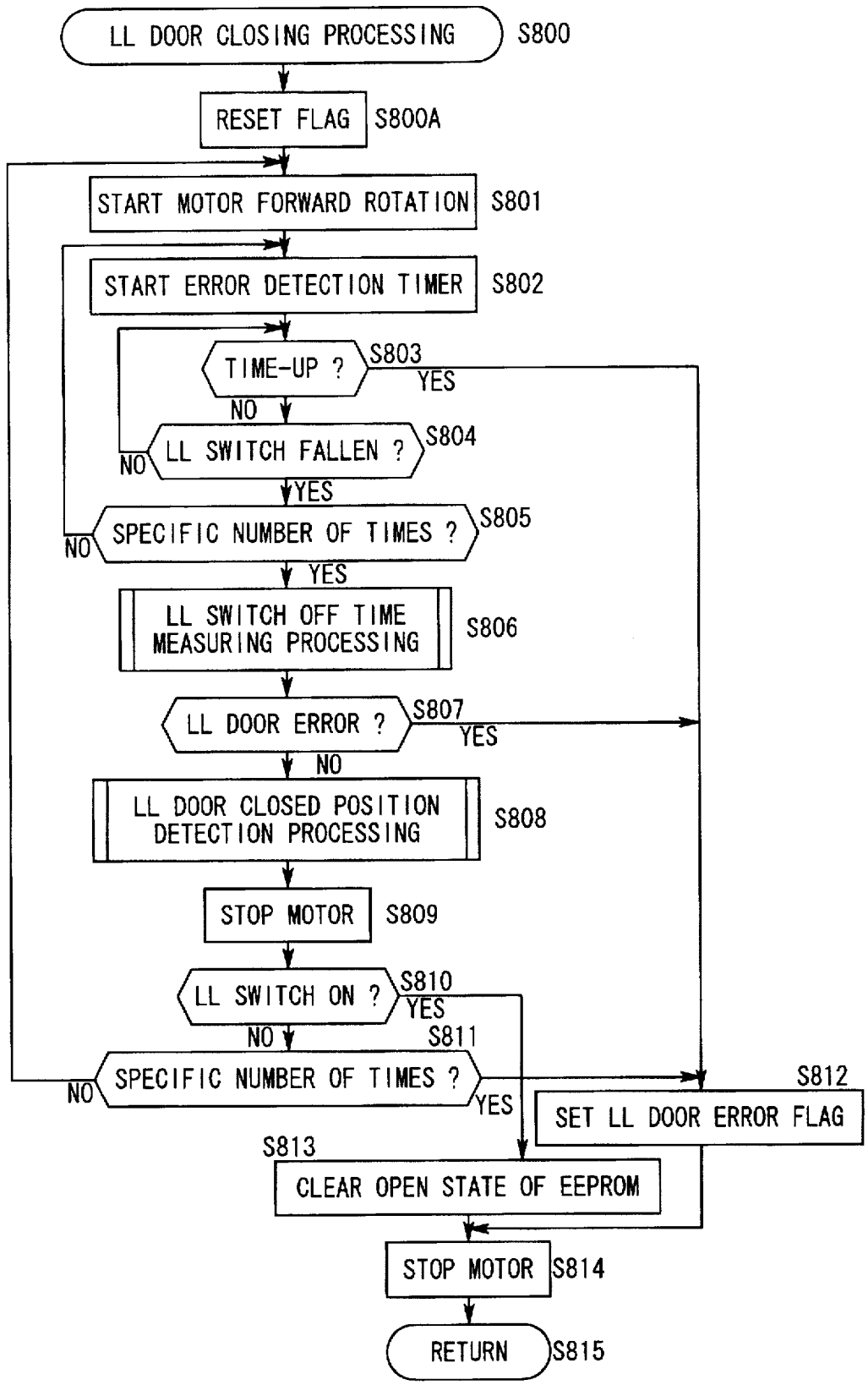
FIG. 19 is a flowchart of the light blocking door closing processing.
Figure 20:
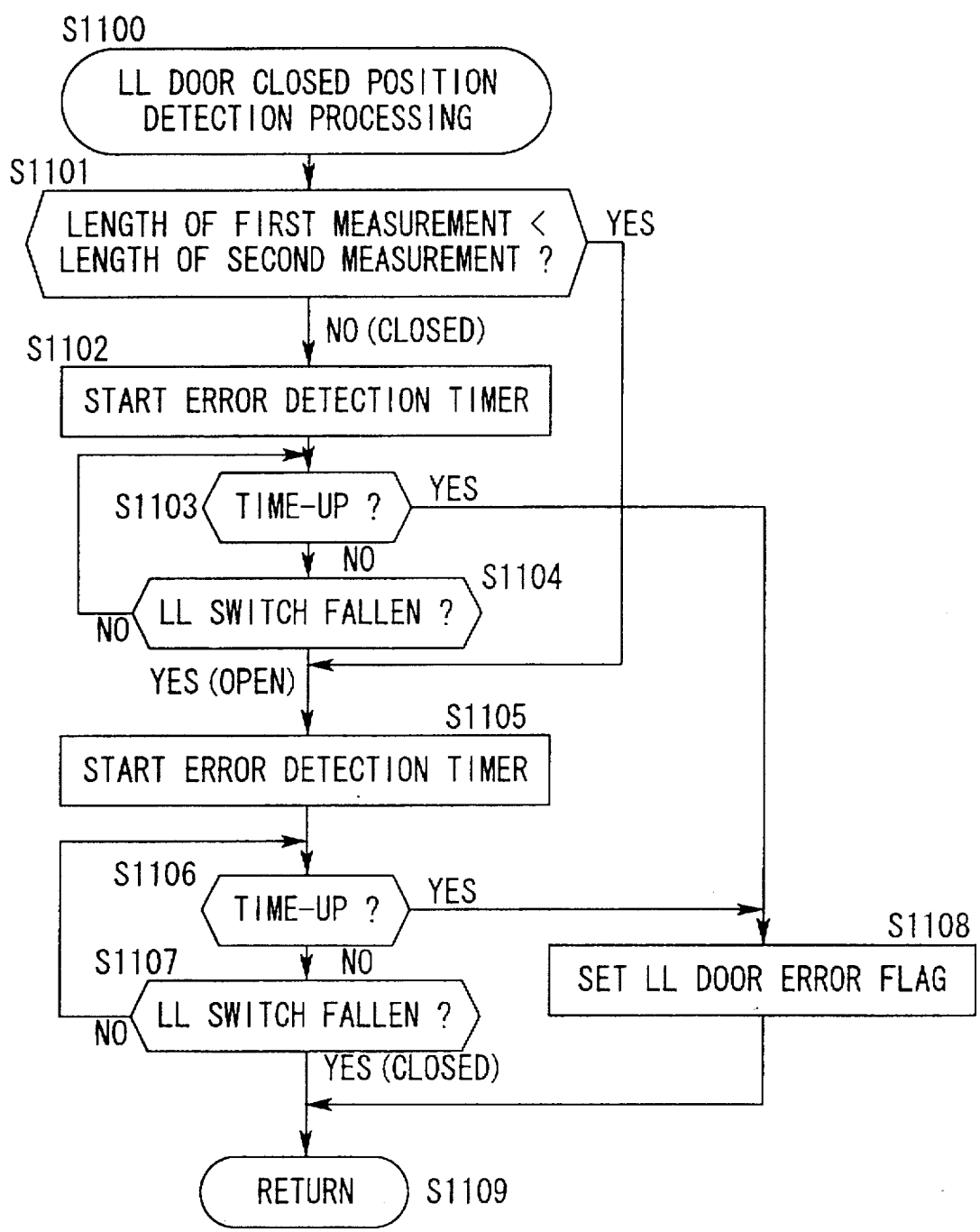
FIG. 20 is a flowchart of the light blocking door closed position detection processing.

Now, the light blocking door closing processing performed in step S613 in FIG. 15 is explained in reference to FIGS. 19 and 20. FIG. 20 is a flowchart presenting more detailed processing of the flowchart in FIG. 19.

First, in step S800A, the light blocking door error flag is reset. Then the motor 4 is caused to rotate in the forward direction by sending a signal to the motor drive circuit 32 (step S801). With the motor 4 driven, the gear 3 of the planetary gear clutch mechanism PG is caused to rotate in the clockwise direction and the gear 7 of the light blocking door opening and closing mechanism LDM is driven via the gear 6. The LLS non-detection timer described earlier is set and started (step S802). A verification is made as to whether or not a time-up has occurred at the LLS non-detection timer (step S803) and if a time-up has occurred, the light blocking door error flag is set in step S812. Then, the motor 4 is stopped in step S814 and the operation returns from step S815 to step S613 in FIG. 15.

If a time-up has not occurred at the LLS non-detection timer in step S803, a verification of a fall of the output signal LLS is made (step S804). If the fall of the output signal LLS is verified, the operation proceeds to step S805. If, on the other hand, a fall of the output signal LLS cannot be verified, the operation proceeds to step S803 again to verify whether or not a time-up has occurred at the LLS non-detection timer.

If a fall of the output signal LLS has been verified in step S804, a verification is made as to whether or not the number of times the verification has been made matches a specific value (step S805 ). If the number of times the verification has been made is at the specific value, i.e., twice, for instance, it is decided the rotation of the light blocking door opening and closing mechanism LDM has stabilized and the operation proceeds to step S806. If the number of times the verification has been made is fewer than twice, the operation proceeds to step S802 again to update the LLS non-detection timer for restart.

If a fall of the output signal LLS has been verified twice in step S805, a call for the light blocking switch off time measuring processing is made (step S806 ). The details of the light blocking switch off time measuring processing has been explained in reference to FIG. 17. Then, the operation proceeds to step S807 to make a decision as to whether or not a light blocking door error has occurred. If it is decided that an error has occurred, the operation proceeds to step S812 to set the light blocking door error flag.

After stopping the motor 4 in step S814, the operation proceeds to step S 815 to end the light blocking door closing processing before returning to step S613 shown in FIG. 15. If the light blocking door switch off time measuring processing has ended normally, a negative decision is made in step S807 and the operation proceeds to step S808. When the light blocking door switch off time measuring processing has ended normally, a call is made for the light blocking door closed position detection processing (step S808 ). The details of the light blocking door closed position detection processing are to be given later.

When the light blocking door 26 has been driven to the closed position in step S808, the motor 4 is stopped (step S809). The method for stopping the motor 4 has been explained earlier. After the motor is stopped, the state of the output signal LLS is verified (step S810). If the output signal LLS is in an on state in step S810, the information indicating that the light blocking door 26 is in an open state that has been stored in the EEPROM 37 is cleared (step 813). Then the operation proceeds to steps S814 and S815 before returning to step S613 shown in FIG. 15.

If the output signal LLS is in an off state, the operation proceeds to step S811 to verify the number of times a negative decision has been made in step S810. If the number of times the processing has been performed is two, the operation proceeds to step S812 to set the light blocking door error flag. After this, the operation proceeds to steps S814 and S815 before returning to step S613 shown in FIG. 13.

(Light Blocking Door Closed position Detection processing)

FIG. 20 is a flowchart showing details of the light blocking door closed position detection processing performed in step S808 in FIG. 19.

The processing starts in step S1100. If it is decided in step S1101 that the first LLS off time is greater than the second LLS off time, the LLS non-detection timer is set and started (step S1102). In step S1103, a verification is made as to whether or not a time-up has occurred at the LLS non-detection timer which has been started in step S1102. If a time-up has occurred at the LLS non-detection timer, the operation proceeds to step S1108 to set the light blocking door error flag. In step S1109, the light blocking door closed position detection processing is ended and the operation returns to step S808 shown in FIG. 19. If, on the other hand, a time-up has not occurred at the LLS non-detection timer, a verification of a fall of the output signal LLS is made (step 1104). If a fall of the output signal LLS is verified, the operation proceeds to step S1105. If, on the other hand, a fall of the output signal LLS cannot be verified, the operation returns to step S1103.

If a fall of the output signal LLS has been verified in S1104, the LLS non-detection timer is set and started again (step S1105). If the first LLS off time is greater than the second LLS off time, too, the LLS non-detection timer is set and started. In step S1006, a verification is made as to whether or not a time-up has occurred at the LLS non-detection timer, which has been started in step S1105. If a time-up has occurred at the LLS non-detection timer, the operation proceeds to step S1108 to set the light blocking door error flag. The light blocking door closed position detection processing is ended in step S1109 and the operation returns to step S808 shown in FIG. 19. If on the other hand, a time-up has not occurred at the LLS non-detection timer, a verification of a fall of the output signal LLS is made (step S1107). If a fall of the output signal LLS is verified, the operation proceeds to step S1109 to end the light blocking door closed position detection processing before returning to step S808 shown in FIG. 19.

It is to be noted that since the light blocking door is in an open state if an affirmative decision is made in step S 1001 in FIG. 18, control may be performed to set the light blocking door in the open state by stopping the motor immediately. However, since there is a likelihood, in this case, that the light blocking door will not stop at the open position correctly, due to overrun of the motor or the like, it is desirable to execute steps S1002~S1007 as shown in FIG. 18. The same applies to FIG. 20 and steps S1102~S1107 may be omitted.

While, in the explanation given above, the output signal LLS is in an on state when the light blocking door 26 is at the opened position and at the closed position, the present invention is not limited to this arrangement. In addition, although the explanation has been given by using a specific pattern in regard to the output signal LLS, the pattern is not limited to this particular pattern and other patterns may be used. Furthermore, the explanation has been given using specific numerical values in this embodiment, the present invention is not limited in the use of these numerical values and other numerical values may be set. Moreover, while setting and starting of the LLS non-detection timer are performed every time the light blocking switch rises or falls, the LLS non-detection timer may be set and started when this subroutine has been called.

Second Embodiment

Figure 22:
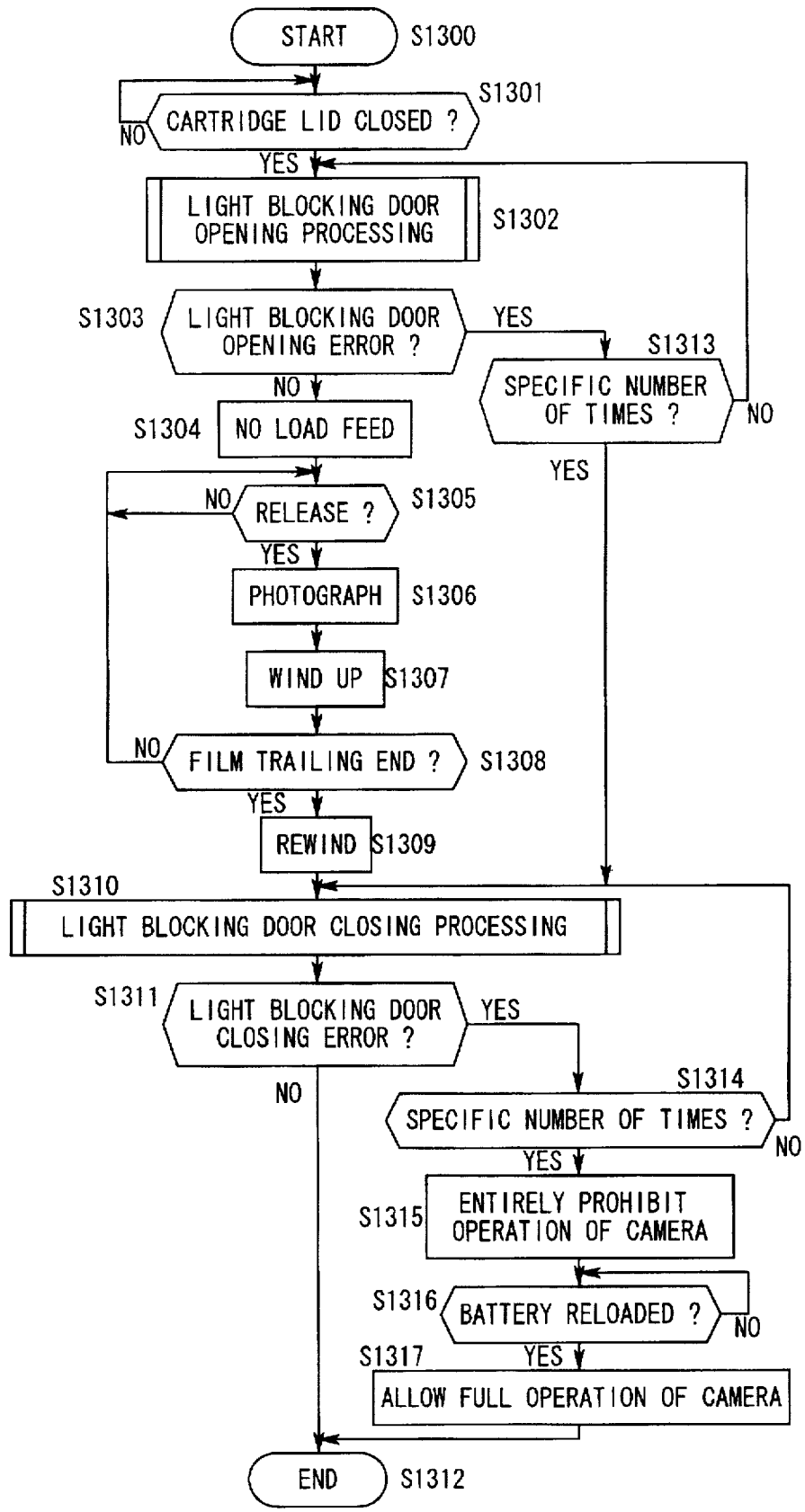
FIG. 22 is a flowchart of the main routine in the second embodiment according to the present invention.
Figure 23:
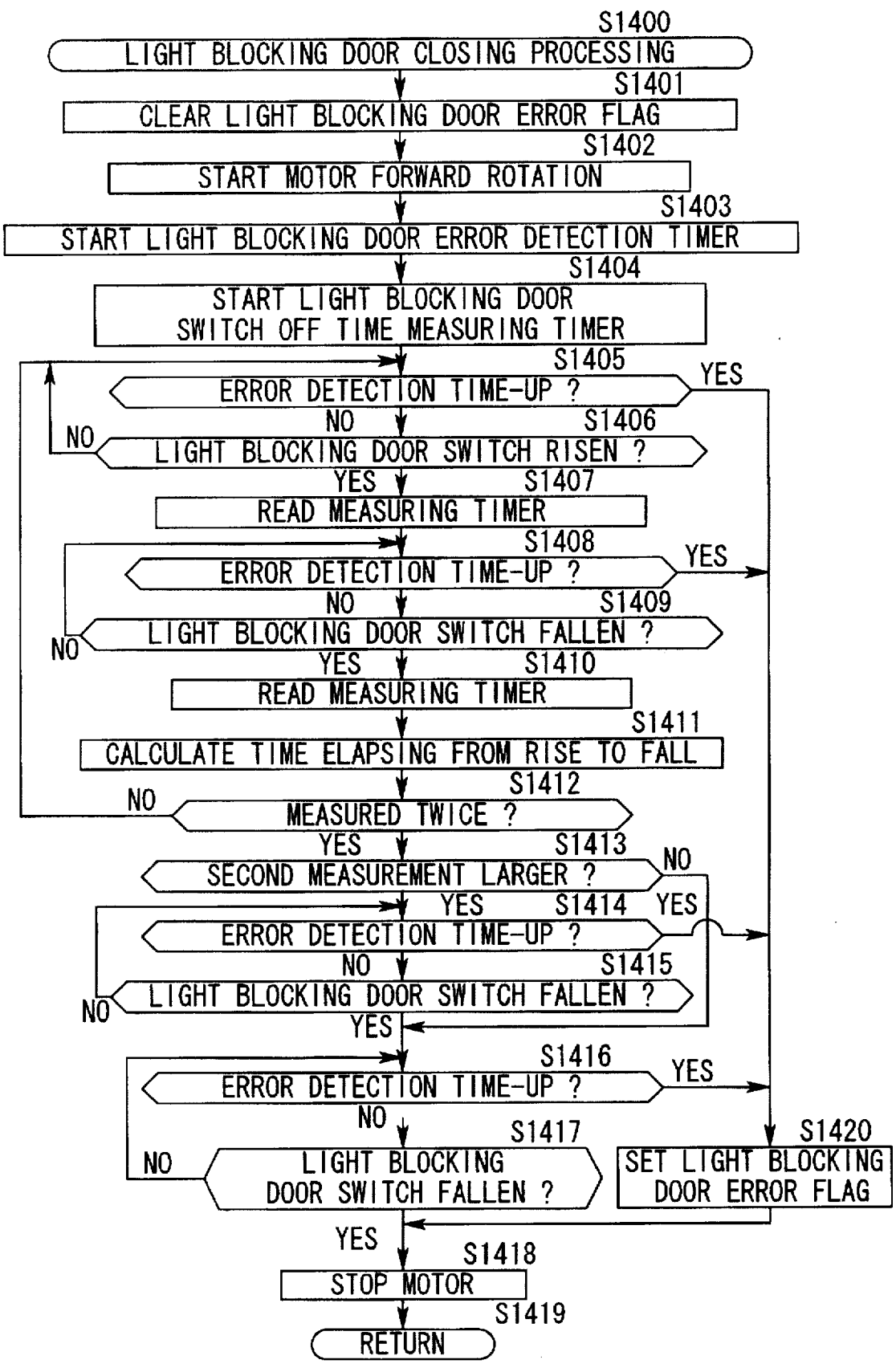
FIG. 23 is a flowchart of the light blocking door opening processing.
Figure 24:
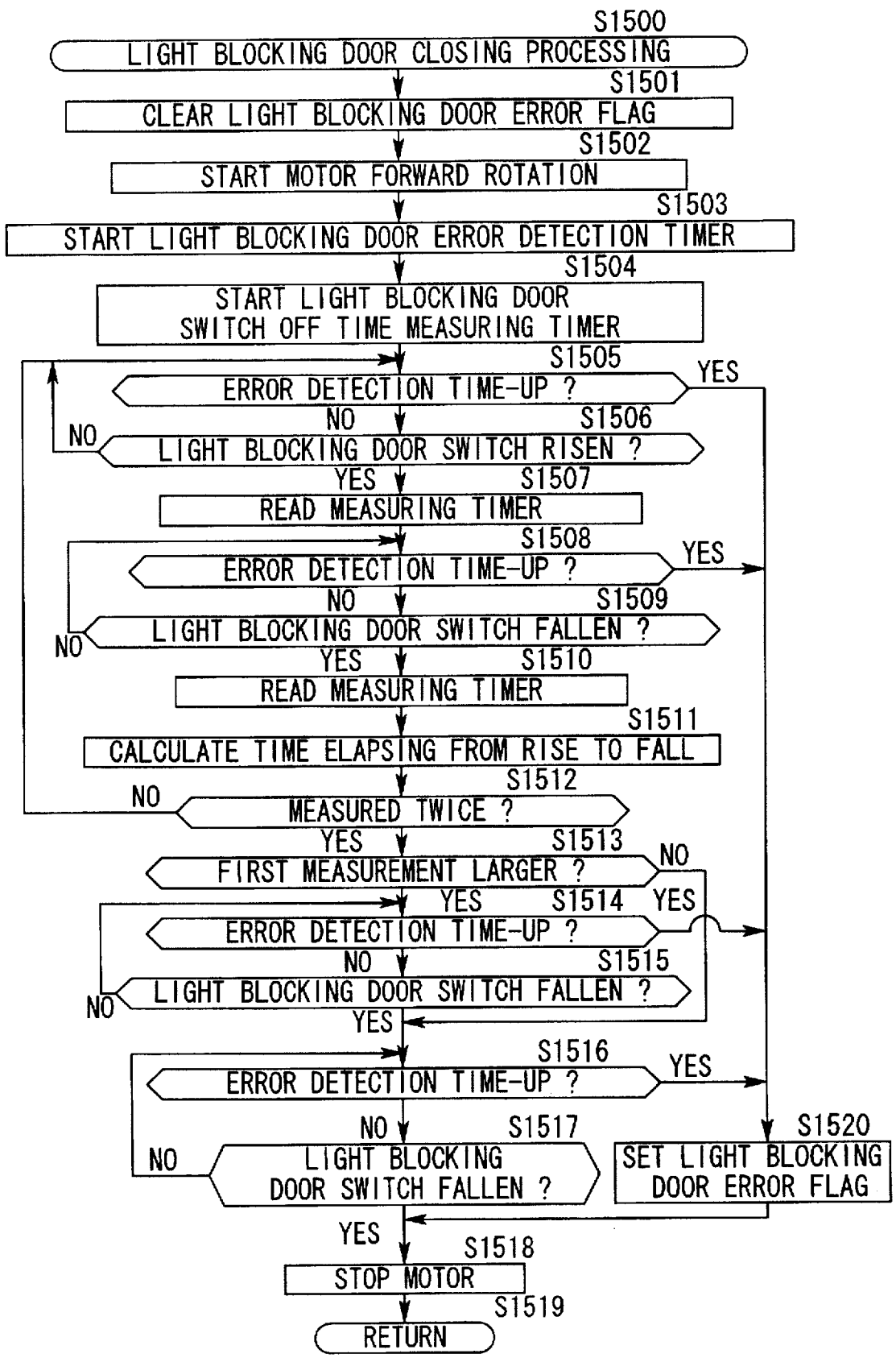
FIG. 24 is a flowchart of the light blocking door closing processing.

A second embodiment according to the present invention is explained in reference to FIGS. 22~24.

The configuration of the hardware portion of the apparatus is almost identical to that employed in the first embodiment and only the contents of the control are different.

(Main Routine)

In step S1300 shown in FIG. 22, a battery (not shown) has already been loaded and the processing is underway. The state of the switch SW3 is detected in step S1301 and if it is decided that the switch SW3 has shifted from on to off, it is determined that the cartridge chamber lid has been closed and the operation proceeds to step S1302. If, on the other hand, it is decided that the state of the switch SW3 has not changed, step S1301 is repeated. After detecting the closed state of the cartridge chamber lid, the operation remains in standby for a specific length of time and then, in step S1302, the light blocking door opening processing for the cartridge 21 is performed. The light blocking door opening processing is to be detailed later.

In step S1303, a decision is made as to whether or not an error has occurred in the light blocking door opening processing and if there has been an error, the operation proceeds to step S1313, whereas, if there has been no error, the operation proceeds to step S1304. In step S1313, a decision is made as to whether or not the number of times the operation has undergone the light blocking door opening processing (step S1302), i.e., the number of times an abnormal operation has occurred in the light blocking door opening processing has reached a specific number. If it has reached the specific number (5 times, for instance), the operation proceeds to step S1310, whereas, if it has not reached the specific number, the operation returns to step S1302.

In step S1304, no load feed is performed. Namely, the film 24 is fed from the cartridge 21 and the first frame is placed facing opposite the aperture of the camera. In step S1305, the operation waits for the release operation and when the shutter release operation is performed, the operation proceeds to step S1306.

In step S1306, photographing is performed. In step S1307, the film 24 is wound up until the next frame is positioned facing opposite the aperture. In step S1308, a decision is made as to whether or not the film has reached its trailing end during the film wind up operation and if it has not yet reached its trailing end, the film feed is stopped and the operation returns to step S1305. If the film 24 cannot be wound up by one frame normally, it is decided that the film has reached its trailing end and the operation proceeds to step S1309. In step S1309, the film 24 is rewound so that the entire film 24 is wound back into the cartridge 21.

When the rewind is completed, or when an affirmative decision is made in step S1313, the light blocking door closing processing is performed in step S1310. Details of the light blocking door closing processing are to be given later. In step S1311, a decision is made as to whether or not an error has occurred in the light blocking door closing processing. If there has been an error, the operation proceeds to step S1314, whereas, if there has been no error, the sequence ends. In step S1314, a decision is made as to the number of times an error has been detected during the light blocking door closing processing. If the number of times an error has been detected has reached a specific number (5 times, for instance), the operation proceeds to step S1315, whereas, if the number of times an error has been detected has not reached the specific number, the operation proceeds to step S1310.

In step S1315, the operation of the entire camera, including shutter release, is prohibited. In step S1316, a decision is made as to whether or not a new battery has been loaded, and if one has been loaded, the operation proceeds to step S1317, whereas, if no new battery has been loaded, step S1316 is repeated. In step S1317, the prohibition of operation of the entire camera is cleared, to end the sequence. With the sequence ended, it becomes possible for the user of the camera to open the cartridge chamber lid to remove the cartridge 21. When the cartridge 21 has been taken out and the switch SW3 has come on, the operation returns to step S1300, and when the user loads a new cartridge 21, the processing starts again.

(Light Blocking Door Opening processing)

The light blocking door opening processing is explained in reference to FIG. 23.

By calling up step S1400 in step S1302 in FIG. 22, the light blocking door opening processing is started. In step S1401, the light blocking door error flag, which indicates an error in the light blocking door opening and closing processing, is cleared. In step S1402, a signal is sent from the control device 60 to the motor drive circuit 32 to cause the motor 4 to rotate in the forward direction. With the motor 4 rotating in the forward direction, the light blocking door 26 repeats the opening/closing operation. In step S1403, a light blocking door error detection timer is set and the counting is started. In step S1404, the off time measuring timer for the switch SW1 is set and counting of the time is started.

In step S1405, a decision is made as to whether or not a time-up has occurred at the light blocking door error detection timer. If a time-up has occurred, the operation proceeds to step S1420, whereas, if a time-up has not occurred, the operation proceeds to step S1406. In step S1406, a decision is made as to whether or not the output from the switch SW1 has risen. If it has risen, the operation proceeds to step S1407, whereas, if it has not risen, the operation returns to step S1405. In step S1407, the off time measuring timer is read and the result is stored in memory before the operation proceeds to step S1408.

In step S1408, a decision is made as to whether or not a time-up has occurred at the light blocking door error detection timer. If a time-up has occurred, the operation proceeds to step S1420, whereas, if a time-up has not occurred, the operation proceeds to step S1409. In step S1409, a decision is made as to whether or not the output from the switch SW1 has fallen. If it has fallen, the operation proceeds to step S1410, whereas, if it has not fallen, the operation proceeds to step S1408. In step S1410, the time counted on the off time measuring timer is read and stored in memory before the operation proceeds to step S1411. In step S1411, the length of time over which the switch SW1 has remained off (the length of time elapsing from the rise the until the fall of the output from the switch SW1 ) is calculated based upon the lengths of time read in steps S1407 and S1410 and is stored in memory.

In step S1412, a decision is made as to whether or not the length of time over which the switch SW1 has remained off has been calculated twice. If it has been calculated twice, the operation proceeds to S1413, whereas, if it has not yet been calculated twice, the operation returns to step S1405. By running the sequence starting with step S1405 through step S1412 twice in this manner,the length of two successive off times of the switch SW1 is calculated. In step S1413, the two lengths of off time thus calculated are compared to each other. If it is decided that the second off time is greater, the operation proceeds to step S1414, whereas, if the length of the second off time is smaller, the operation proceeds to step S1416.

In step S1414, a decision is made as to whether or not a time-up has occurred at the light blocking door error detection timer. If a time-up has occurred, the operation proceeds to step S1420, whereas, if a time-up has not occurred, the operation proceeds to step S1415. In step S1415, a detection is made as to whether or not the output from the SW1 has fallen. If a fall is detected, the operation proceeds to step S1416, whereas, if no fall is detected, the operation returns to step S1414.

In step S1416, a decision is made as to whether or not a time-up has occurred at the light blocking door error detection timer. If a time-up has occurred, the operation proceeds to step S1420, whereas, if a time-up has not occurred, the operation proceeds to step S1417. In step S1417, a detection is made as to whether or not the output from the switch SW1 has fallen. If a fall is detected, the operation proceeds to step S1418, whereas, if no fall is detected, the operation returns to step S1416.

As described above, if it is determined in step S1405, step S1408, step S1414 or step S1416 that a time-up has occurred at the light blocking door error detection timer, the operation proceeds to step S1420. In step S1420, the light blocking door error flag is set before the operation proceeds to step S1418. In step S1418, the motor 4 is stopped and the operation returns to step S1302.

As has been explained so far, in this embodiment, if an error in the light blocking door closing processing has been detected, the light blocking door closing processing is attempted again. For instance, even if fine dust or the like has adhered to the switch SW1, preventing detection of the open/closed state of the light blocking door 26, the dust or the like may be cleared during the repetition of the light blocking door closing processing, restoring a normal state and in such a case, the likelihood of the opening processing being performed normally may be ultimately improved.

It is to be noted that while, in this embodiment, the motor 4 is stopped in step S1418 after detecting a fall of the output from the switch SW1 twice in steps S1413~S1417 to ensure that the light blocking door 26 is reliably stopped in the open position, the detection of the fall may be omitted and the motor 4 may be stopped directly while in the state achieved in step S1413.

(Light Blocking Door Closing processing)

The following is an explanation of the light blocking door closing processing in reference to FIG. 24.

The light blocking door closing processing is started by calling up step S1500 in step S1310 in FIG. 24. In step S1501, the light blocking door error flag, which indicates an error in the light blocking door opening and closing processing, is cleared. In step S1502, the motor 4 is caused to rotate in the forward direction. With the motor 4 rotating in the forward direction, the light blocking door 26 repeats the opening and closing operations. In step S1503, the light blocking door error detection timer is set to start counting. In step S1504, the off time measuring timer for the switch SW1 is set to start counting.

In step S1505, a decision is made as to whether or not a time-up has occurred at the light blocking door error detection timer. If a time-up has occurred, the operation proceeds to step S1520, whereas, if a time-up has not occurred, the operation proceeds to step S1506. In step S1506, detection is performed as to whether or not the output from the switch SW1 has risen. If a rise is detected, the operation proceeds to step S1507, whereas, if a rise is not detected the operation returns to step S1505. In step S1507, the off time measuring timer is read out and is stored in memory before the operation proceeds to step S1508.

In step S1508, a decision is made as to whether or not a time-up has occurred at the light blocking door error detection timer. If a time-up has occurred, the operation proceeds to step S1520, whereas, if a time-up has not occurred the operation proceeds to step S1509. In step S1509, it is detected whether or not the output from the switch SW1 has fallen. If a fall is detected, the operation proceeds to step S1510, whereas, if no fall is detected, the operation proceeds to step S1508. In step S1510, the time counted on the off time measuring timer is read and stored in memory before the operation proceeds to step S1511. In step S1511, the length of time over which the switch SW1 has remained off (the time elapsing from the rise through the fall of the output from the switch SW1) is calculated based upon the lengths of time read in step S1507 and step S1510 and is stored in memory.

In step S1512, a decision is made as to whether or not the length of time over which the switch SW1 has remained off has been calculated twice. If the calculation has already been performed twice, the operation proceeds to step S1513, whereas, if the calculation has not been performed twice yet, the operation returns to step S1505. By running the sequence starting from step S1505 through step S1512 twice in such a manner, two successive lengths of off time of the switch SW1 are calculated. In step S1513, the two lengths of off time thus calculated are compared against each other. If it is decided that the first length of off time is greater, the operation proceeds to step S1514, whereas, if it is decided that the first length of off time is smaller, the operation proceeds to step 1516.

In step S1514, a decision is made as to whether or not a time-up has occurred at the light blocking door error detection timer. If a time-up has occurred, the operation proceeds to step S1520, whereas, if a time-up has not occurred, the operation proceeds to step S1515. In step S1515, it is detected whether or not the output from the switch SW1 has fallen, and if a fall is detected, the operation proceeds to step S1516, whereas, if no fall is detected, the operation returns to step S1514.

In step S1516, a decision is made as to whether or not a time-up has occurred at the light blocking door error detection timer. If a time-up has occurred, the operation proceeds to step S1520, whereas, if a time-up has not occurred, the operation proceeds to step S1517. In step S1517, a detection is made as to whether or not the output from the switch SW1 has fallen, and if a fall is detected, the operation proceeds to step S1518, whereas, if no fall is detected, the operation returns to step S1516.

If it is decided in step S1505, step S1508, step S1514 or step S1516 that a time-up has occurred at the light blocking door error detection timer, the operation proceeds to step S1520, in which the light blocking door error flag is set. In step S1518, the motor is stopped and the processing returns to step S1310 shown in FIG. 22.

It is to be noted that while the motor 4 is stopped in step S1518 after detecting a fall of the output from the switch SW1 twice in steps S1513~S1517 to ensure that the light blocking door 26 is reliably stopped at the closed position, the detection of the fall may be omitted and the motor 4 may be stopped directly while in the state in step S1513.

As has been explained, in this embodiment, when an error is detected in the light blocking door closing processing, the light blocking door closing processing is attempted again, and if an error occurs continuously over a specific number of times, the operation of the camera is entirely prohibited. Since the operation of the camera is entirely prohibited in this manner, there is no risk of exposing the film 24 by opening the cartridge chamber when the light blocking door 26 is not completely closed. In addition, even when fine dust or the like, for instance, is adhered to the switch SW1, inhibiting detection of the open/closed state of the light blocking door 26, since the dust or the like may be removed while the light blocking door closing processing is being repeated, to restore a normal state, ultimately it is possible to improve the likelihood of the closing processing being performed normally.

Figure 25:
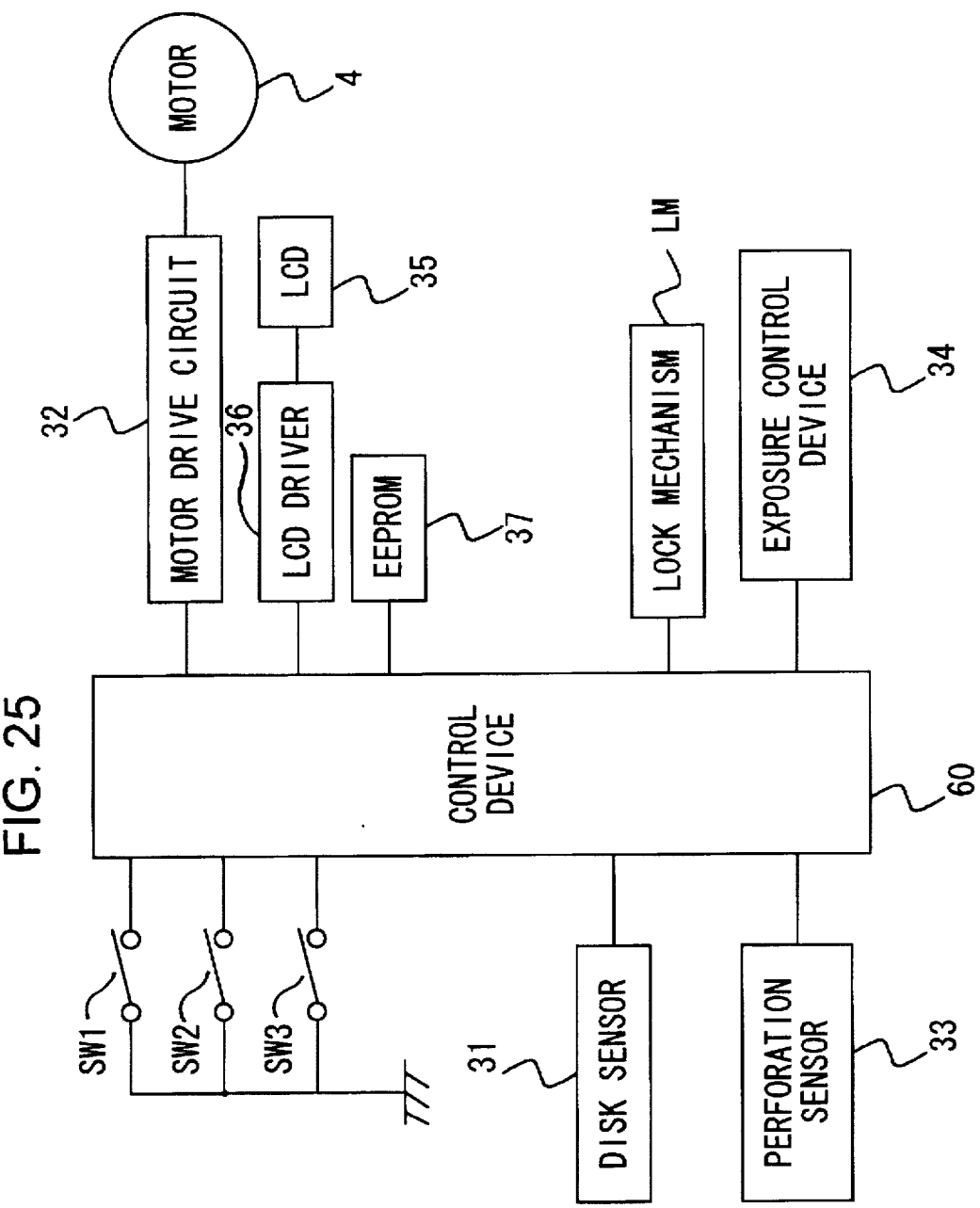
FIG. 25 is a block diagram showing another embodiment of the control device in light blocking door opening and closing mechanism and FIG. 26 is a cross section of a portion of camera.
Figure 26:
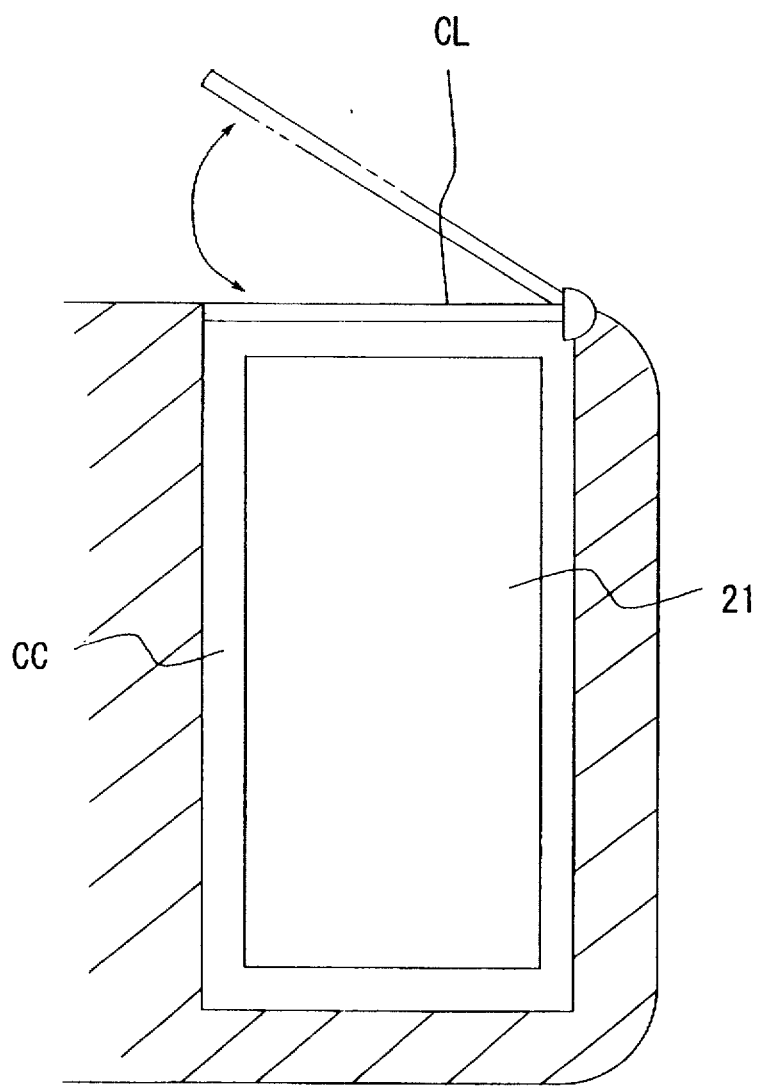

While, in this embodiment, the operation of the camera is entirely prohibited if the closing processing for the light blocking door 26 is not performed normally, the opening of the cartridge chamber, for instance, may be prohibited instead of prohibiting the entire operation. In the case, as shown in the block diagram in FIG. 25, a lock mechanism LM may be provided at the cartridge chamber lid CL which opens and closes the cartridge chamber CC (FIG. 26) of the camera so that when the closing processing of the light blocking door 26 cannot be performed normally, a prohibit command is sent from the control device 60 to the lock mechanism LM to prohibit the opening of the cartridge chamber lid. FIG. 25 differs from the block diagram shown in FIG. 14 only in that the lock mechanism LM is provided. In addition, instead of entirely prohibiting the operation, it is also acceptable to prohibit only the shutter release. By disabling the shutter release, the user will be notified of an abnormally in the closing processing of the light blocking door so that the user will be warned not to expose the film inadvertently.

We claim:

1. An apparatus that opens and closes a light blocking door provided at a film feed slot of a film cartridge, said light blocking door moving between an open position and a closed position, said apparatus comprising:

a drive device that drives said light blocking door between said open position and said closed position;

a single switch that outputs a signal with a specific pattern with a light blocking door opening and closing operation of said drive device;

a decision device that decides whether the light blocking door is positioned at one of said open position, said closed position and a position between said open position and said closed position based upon said signal from said single switch; and a control device that controls said drive device based upon a decision of said decision device.

2. An apparatus that opens and closes a light blocking door provided at a film feed slot of a film cartridge, comprising:

a drive device that drives said light blocking door to open and close, said drive device being provided with a rotating member which rotates continuously in a specific direction open and close said light blocking door repeatedly;

a single switch that outputs a signal with a specific pattern with a light blocking door opening and closing operation of said drive device; and a control device that controls said drive device based on an output signal from said switch.

3. An apparatus according to claim 2, wherein:

said switch includes a switch pattern that is integrated with said rotating member and a brush that slides on said switch pattern as said rotating member rotates.

4. An apparatus according to claim 3, wherein:

said control device includes a detection unit that detects a current position of said light blocking door based upon a change in said output signal from said switch, and a control unit that stops said drive device based upon a detection output from said detection unit.

5. An apparatus according to claim 4, further comprising:

a decision making device that makes a decision as to whether or not an operating state of said drive device has stabilized, wherein:

said detection unit and said control unit operate after said operating state of said drive device is determined to have stabilized.

6. An apparatus according to claim 4, wherein:

said signal with said specific pattern is constituted with a plurality of pulse signals; and said detection unit detects a current state of said light blocking door by comparing widths of at least two pulse signals that are continuously output.

7. An apparatus according to claim 1, further comprising:

an error detection device that outputs an error detection signal if a specific change is not detected in said signal when a specific length of time has elapsed after start of an operation of said drive device, wherein:

said control device controls said drive device to close of said light blocking door when said error detection signal is output after start of a light blocking door opening operation performed by said drive device.

8. An apparatus according to claim 7, wherein:

said control device stops said drive device when said error detection signal is output after start of a light blocking door closing operation of said drive device.

9. An apparatus according to claim 1, wherein:

said control device stops said drive device when it is decided that said light blocking door is at one of said open position and said position.

10. An apparatus according to claim 9, wherein:

said decision device makes a decision as to whether or not said light blocking door is at one of said open position and said closed position said output signal from said switch after said drive device has stopped, and said control device causes said drive device to operate again if said light blocking door is determined to be not at one of said open position and said closed position.

11. An apparatus that opens and closes a light blocking door provided at a film feed slot of a film cartridge, comprising:

a drive device that opens and closes said light blocking door;

a switch that outputs a signal with a specific pattern with a light blocking door opening and closing operation of said drive device;

a control device that controls said drive device based upon an output signal from said switch;

a detection device that detects a state in which said light blocking door is not driven normally to output an error detection signal, after an operation of said drive device has started; and a prohibiting device that prohibits operation of said opening and closing apparatus including operation of said drive device in response to said error detection signal.

12. An apparatus according to claim 11, wherein:

said detection device outputs said error detection signal if a specific change is not detected in said output signal when a specific length of time has elapsed after start of operation of said drive device.

13. An apparatus according to claim 11, wherein:

said prohibiting device sustains prohibition of operation of said opening and closing apparatus until a source battery is loaded again.

14. An apparatus that opens and closes a light blocking door provided at a film feed slot of a film cartridge, comprising:

a drive device that drives said light blocking door to open and close;

a switch that outputs a signal with a specific pattern with a light blocking door opening and closing operation of said drive device, a control device that controls said drive device based upon an output signal from said switch;

a detection device that detects a state in which said light blocking door is not driven normally after an operation of said drive device has started; and a signal output device that continues said operation of said drive device if a number of times a state in which said light blocking door is not driven normally is detected is fewer than a specific value and outputs an error detection signal when said number of times has reached said specific number.

15. An apparatus according to claim 14, wherein:

said control device controls said drive device so that a closing operation of said light blocking door is performed when said error detection signal is output after start of a light blocking door opening operation performed by said drive device.

16. An apparatus according to claim 15, wherein:

said control device stops said drive device when said error detection signal is output during a light blocking door closing operation performed by said drive device.

17. An apparatus according to claim 14, wherein:

said detection device outputs said error detection signal if a specific change is not detected in said output signal when a specific length of time has elapsed after a start of operation of said drive device.

18. An apparatus that can be loaded with a film cartridge provided with a light blocking door at a film feed slot comprising:

a cartridge chamber where said cartridge is housed, a cartridge chamber lid that opens and closes said cartridge chamber;

a drive device that drives said light blocking door to open and close;

a switch that outputs a signal with a specific pattern with a light blocking door opening and closing operation of said drive device;

a control device that controls said drive device based upon an output signal from said switch;

a detection device that, after a start of operation of said drive device, detects a state in which said light blocking door is not driven normally to output an error detection signal, and a prohibiting device that prohibits opening of said cartridge lid in response to said error detection signal.

19. An apparatus according to claim 18, wherein:

said detection device outputs said error detection signal if a specific change is not detected in said output signal when a specific length of time has elapsed after a start of operation of said drive device.

20. An apparatus that opens and closes a light blocking door provided at a film feed slot as a film cartridge, said light blocking door moving between an open position and a closed position, said apparatus comprising:

a drive device that drives said light blocking door between said open position and said closed position;

a signal output device that outputs a first signal when said light blocking door is at said open position and when said light blocking door is at said closed position, and outputs a second signal when said light blocking door is at a position between said closed position and said open position; and a decision device that decides, when the first signal is output, whether said light blocking door is positioned at said open position or said closed position, based on a condition of said second signal outputted prior to said first signal.

\* \* \* \* \*